United States Patent [19]

Ikeda

[11] Patent Number: 5,428,547
[45] Date of Patent: Jun. 27, 1995

[54] NUMERICAL CONTROL UNIT THAT PRE-ANNOUNCES SCHEDULED OPERATIONS

[75] Inventor: Mutsumi Ikeda, Aichi, Japan

[73] Assignee: Mitsubishi Denki Kabushiki Kaisha, Tokyo, Japan

[21] Appl. No.: 911,544

[22] Filed: Jul. 9, 1992

[30] Foreign Application Priority Data

Jul. 10, 1991 [JP] Japan .................. 3-169847

[51] Int. Cl.⁶ .................. G06F 15/46; G05B 9/02
[52] U.S. Cl. .................. 364/474.16; 364/185; 364/468; 364/551.02
[58] Field of Search .......... 364/184, 185, 468, 401, 364/474.16, 551.02

[56] References Cited

U.S. PATENT DOCUMENTS 4,980,532 12/1990 Morishita .................. 364/474.04
5,089,970  2/1992 Lee et al. .................. 364/468

FOREIGN PATENT DOCUMENTS 60-62441    4/1985  Japan .
60-142403   7/1985  Japan .
61-139802   6/1986  Japan .
61-241805  10/1986  Japan .
63-312043  12/1988  Japan .
63-318244  12/1988  Japan .

Primary Examiner—Paul P. Gordon
Attorney, Agent, or Firm—Sughrue, Mion, Zinn, Macpeak & Seas; Richard C. Turner; Marc Kaufman

[57] ABSTRACT

A numerical control unit and method of operation therefor which pre-announces scheduled parts ordering, maintenance, loading, unloading and inspection times by display or audio notice to an operator. On the basis of a programmed control of the machine in block form and a reference time of day (including day, week, month, year etc.) generated by a clock, time related information is stored and the time for performance of time-related events are calculated. The stored time-related information can include (i) the expected run time for the entire machining program or for a portion of the program until the occurrence of a specific program event, such as the execution of a specified command; (if) the expected schedule times for machine operation and inspection events, such as power-on/off, run start, cutting start, etc.; and (iii), the messages related to operational events and machine conditions. The calculated information can include the expected end times for an entire run, for the occurrence of a specified command, for machine operation and inspection events, determined on the basis of the current time of day and the actual execution of the machine operation. The calculated information is updated with machine operation and is used as the basis for reading and displaying/announcing messages concerning the machine condition.

33 Claims, 34 Drawing Sheets

FIG. 2B

TIME MEMORY TABLE

| | |
|---|---|
| TM(0) | 10 MINUTES 00 SECONDS |
| TM(1) | 15 MINUTES 30 SECONDS |
| TM(2) | 30 MINUTES 45 SECONDS |
| TM(3) | 45 MINUTES 00 SECONDS |
| TM(4) | 1 HOUR 00 MINUTES 02 SECONDS |
| TM(5) | 1 HOUR 12 MINUTES 21 SECONDS |
| | ↓ |
| TM(N − 1) | 2 HOURS 34 MINUTES 56 SECONDS |
| TM(N) | |

MESSAGE MEMORY TABLE

| | |
|---|---|
| MM(0) | M0 STOP |
| MM(1) | M1 STOP |
| MM(2) | CHIP EJECTION |
| MM(3) | M1 STOP |
| MM(4) | CHIP EJECTION |
| MM(5) | M0 STOP |
| | ↓ |
| MM(N − 1) | MACHINING END |
| MM(N) | |

J: RESULTANT TOD MEMORY TABLE POINTER
KI : EXPECTED CHIP VOLUME ACCUMULATION

FIG. 4A

EXPECTED TOD MEMORY TABLE

| | |
|---|---|
| YTM(0) | 10 O'CLOCK 10 MINUTES 00 SECONDS |
| YTM(1) | 10 O'CLOCK 15 MINUTES 45 SECONDS |
| YTM(2) | 10 O'CLOCK 31 MINUTES 00 SECONDS |
| YTM(3) | 10 O'CLOCK 45 MINUTES 15 SECONDS |
| YTM(4) | 11 O'CLOCK 00 MINUTES 17 SECONDS |
| YTM(5) | 11 O'CLOCK 12 MINUTES 36 SECONDS |
| | ↓ |
| YTM(N − 1) | 12 O'CLOCK 35 MINUTES 11 SECONDS |
| YTM(N) | |

RESULTANT TOD MEMORY TABLE

| | |
|---|---|
| JTM(0) | 10 O'CLOCK 10 MINUTES 15 SECONDS |
| JTM(1) | NOT YET SET |
| JTM(2) | NOT YET SET |
| JTM(3) | NOT YET SET |
| JTM(4) | NOT YET SET |
| JTM(5) | NOT YET SET |
| | ↓ |
| JTM(N − 1) | NOT YET SET |
| JTM(N) | |

FIG. 4B

| | MESSAGE | | OCCURENCE TIME OF DAY | |
|---|---|---|---|---|
| ARRIVAL: | | | "M0 STOP" 10:10:15 | |
| PRE-ANNOUNCEMENT: | | WITHIN 3 MIN. | "M0 STOP" 10:07:02 | |

| | MESSAGE | EXPECTED TIME OF DAY | RESULTANT TIME OF DAY | ERROR |
|---|---|---|---|---|
| 1 | "M0 STOP" | 10:10:00 | 10:10:15 | 00:15 |
| 2 | "M1 STOP" | 10:15:45 | --:--:-- | --:-- |
| 3 | "CHIP EJECTION" | 10:31:00 | --:--:-- | --:-- |
| 4 | "M1 STOP" | 10:45:15 | --:--:-- | --:-- |
| 5 | "CHIP EJECTION" | 11:00:17 | --:--:-- | --:-- |
| 6 | "M0 STOP" | 11:12:36 | --:--:-- | --:-- |

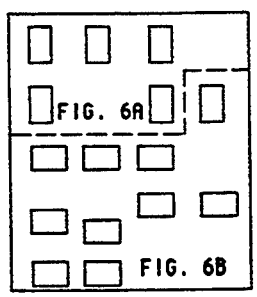

FIG. 7A
RUN SCHEDULE MEMORY AND RUN
RESULT MEMORY STRUCTURES
SCHEDULE POINTER TABLE
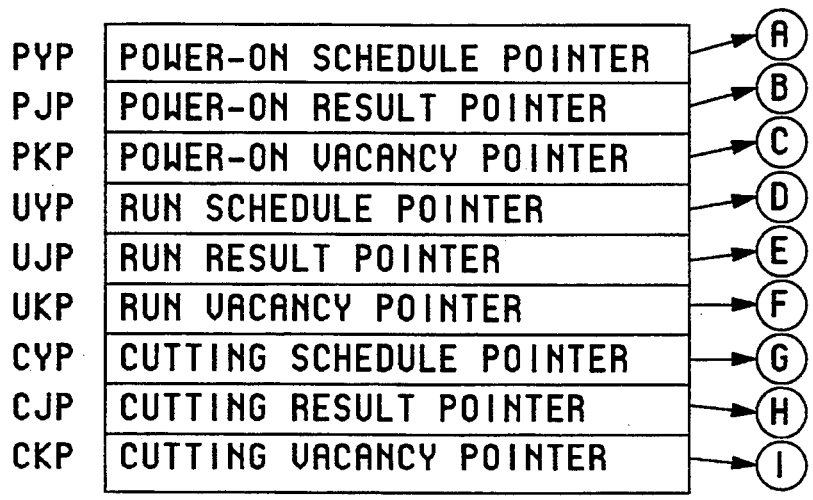
| | | |
|---|---|---|
| PYP | POWER-ON SCHEDULE POINTER | A |
| PJP | POWER-ON RESULT POINTER | B |
| PKP | POWER-ON VACANCY POINTER | C |
| UYP | RUN SCHEDULE POINTER | D |
| UJP | RUN RESULT POINTER | E |
| UKP | RUN VACANCY POINTER | F |
| CYP | CUTTING SCHEDULE POINTER | G |
| CJP | CUTTING RESULT POINTER | H |
| CKP | CUTTING VACANCY POINTER | I |
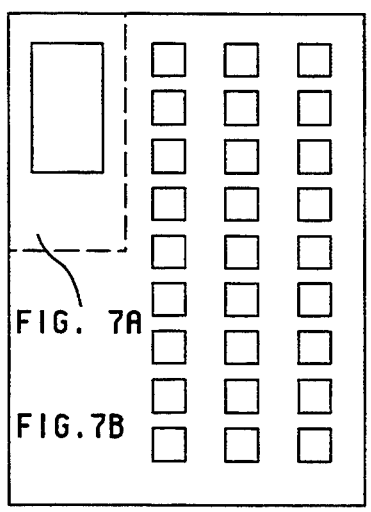
FIG. 7

FIG. 8A

RUN SCHEDULE/RESULT DISPLAY EXAMPLE

| RUN SCHEDULE | SEPTEMBER 20, 1991 |
|---|---|
| ITEM | TIME  0 1 2 3 4 5 6 7 8 9 10 11 12 1 2 3 4 5 6 7 8 9 10 11 12 |
| POWER-ON SCHEDULE RESULT | |
| RUN SCHEDULE RESULT | |
| CUTTING SCHEDULE RESULT | |
| CURRENT TIME OF DAY | 19:05 |

FIG. 8B

INSPECTION SCHEDULE/RESULT DISPLAY EXAMPLE

```
INSPECTION SCHEDULE

INSPEC. WORK TIME OF DAY ARRIV.: BELT REPL.WORK COMP.?  YES/NO
INSPEC. WORK TIME OF DAY PRE-ANNOUN.: OIL LVL. CHECK
DATE: 08:00:00, 1991/09/21
```

| INSPEC. ITEM | SEPT. 19 | SEPT. 20 | SEPT 21 | SEPT. 22 |
|---|---|---|---|---|
| BELT REPLACEMENT | | 16:35 | | |
| BELT ORDERING | | | | |
| BELT TENSION 1 | | | | 16:05 |
| BELT TENSION 2 | | | | |
| OIL LVL. CHECK | 08:10 | 08:10 | 08:10 | 08:10 |
| PWR. SUPP. INSPEC. | 08:10 | | | |
| SLIDE CVR. CLEAN. | 08:10 | 13:10 | | 08:10 |
| CHUCK LUBRICATION | 08:10 | 13:10 | | 08:10 |
| COOLING FAN CLEAN. | 08:10 | | | |
| CURRENT TIME OF DAY | | 19:05 | | |

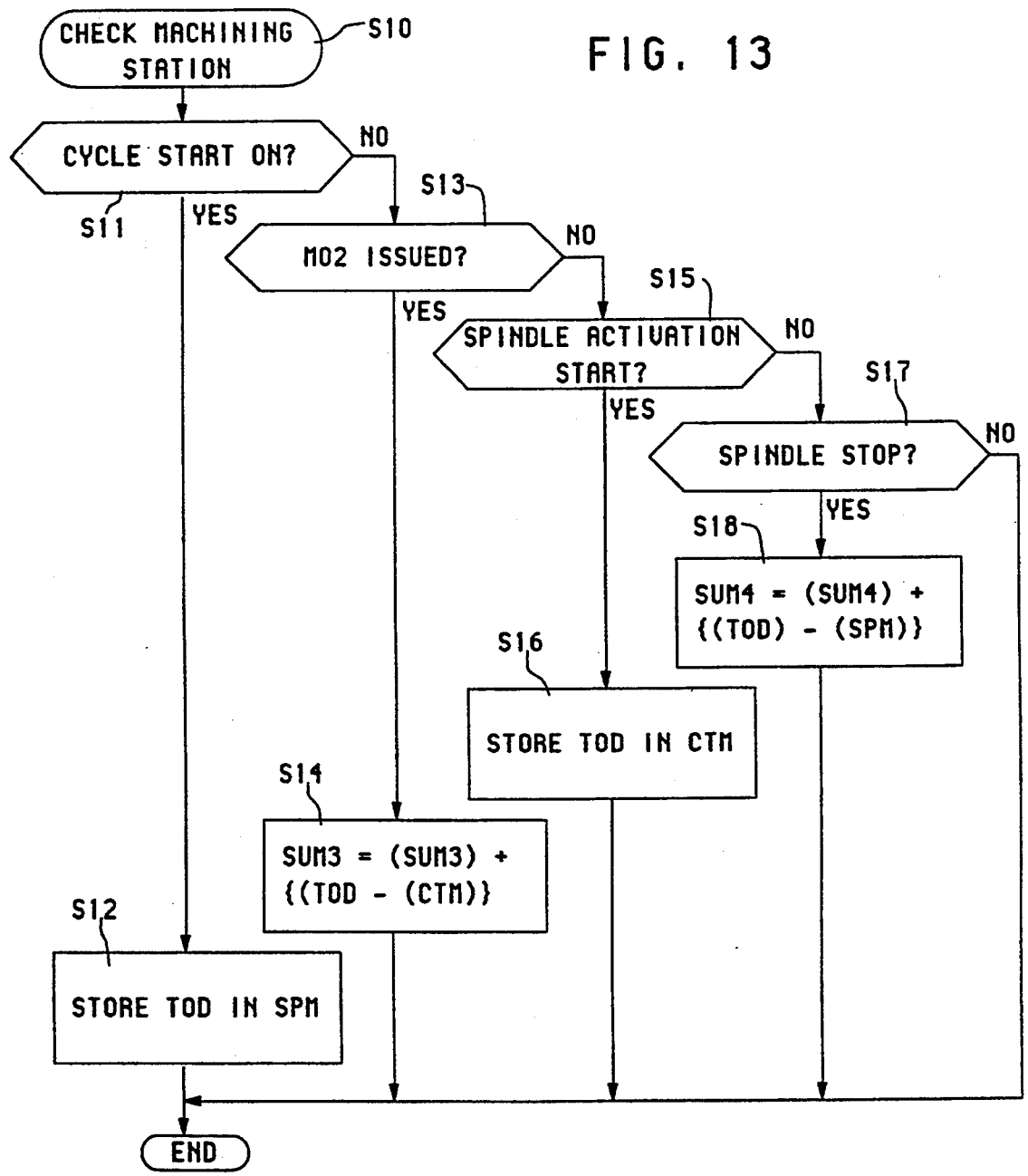

FIG. 14B

MACHINING RESULT TOTALIZATION TABLE

| MACRO VAR VALUE | WORKPC. NAME | NO. OF MACH. OPER. COMPLETE | MACH. START TIME OF DAY | MACH. END TIME OF DAY |
|---|---|---|---|---|
| 1234 | BUHIN-A | | | |
| 1120 | BUHIN-B | | | |
| 1222 | BUHIN-C | | | |
| | | | | |

FLOWCHART OF OPERATION TIME
DISPLAY SYSTEM EMBODIMENT

FIG. 15B

STRUCTURE OF OPERATION
TIME OF DAY STORED

| (PR)<br>PROGRAM NUMBER | (MS)<br>OPERATION START<br>TIME OF DAY | (ME)<br>OPERATION END<br>TIME OF DAY |
|---|---|---|
| ↓ | ↓ | ↓ |

NUMERICAL CONTROL UNIT THAT PRE-ANNOUNCES SCHEDULED OPERATIONS

BACKGROUND OF THE INVENTION

1. Field of the Invention

The present invention relates to a machine tool numerical control unit for assisting in enhancing the efficiency of work by estimating and notifying a worker beforehand of scheduled work times of day for setup change, chip ejection, periodic inspection, etc., in, for example, a labor-saved, machining work site where one worker operates a plurality of machine tools.

2. Description of the Background Art

In FIG. 13, a flowchart is illustrated which concerns the processing of a programmable controller having conventional clock function as disclosed in Japanese Patent Publication No. 139802 of 1986. This flowchart is for processing data that concerns the timing of a machining operation and, in particular, concerns the identification of any of several steps in a machining cycle and the storage of times related to the spindle operation. First, in step S10, machining is initiated at the start of the machining cycle and then a determination is made as to whether the machine cycle start command is ON (step S11). If it is ON, in step S12, a current time of day (TOD) is read and stored as the machining cycle start time of day in a current time memory (CTM), and the processing ends. If the cycle start command is not ON as determined in step S11, a determination is made in step S13 as to whether a machining end command (M02) has been issued by the machining program. When the M02 command has not been issued, a determination is made at step S15 as to whether the spindle is then to be actuated by the machining program. If actuation is to be made as determined at step S15, the current time of day (TOD) is stored as a spindle actuation start time of day in a spindle memory (SPM) at step 16 and the processing ends. When the result of the determination in step S15 is that actuation is not to be made, a determination is made at step S17 as to whether the machining by the spindle is finished and the machining program has given a spindle-stop command. If no such command is given, the processing ends, If the spindle stop command has been given as determined at step S17, a resultant spindle operation time (SAM4) is calculated by subtracting the time of day previously set in the SPM from the current time of day, adding that difference to the previous SAM4 value and storing the resultant spindle operation time (SAM4), at step 18. Similarly, when the machining program issues a machining end command M02 and such command is detected at step S13, a resultant machining time (SAM3) is calculated at step S14 and the machining is terminated. The resultant machining time (SAM3) is calculated by subtracting the time of day in the CTM from the current time of day (TOD) and adding that value to the last previously stored value of SAM3, at step S14.

When machining is to be started by a next program and the spindle actuated, similar processing is performed. The resultant machining time SAM3 and resultant spindle operation time SAM4 are newly added and accumulated. Accordingly, by reading the SAM3 and/or SAM4 as required, the accumulated resultant machining time, the resultant machining time on a program number basis, etc., can be obtained. These times can be displayed to an operator in order to ensure ease of resultant machining time management.

FIG. 14A is a processing flowchart and FIG. 14B is a machining result totalization table illustrating an example of a conventional machining result totalizer for use with an NC machine tool disclosed in Japanese Patent Publication No. 312043 of 1988.

The machining result totalization table is made up to allow macro variable values and workpiece names to be cross-referenced. For instance, the macro variable value "1234" corresponds to the workpiece name "PART-A". This machining result totalization table includes a "machining start time of day section", a "machining end time of day section" and a "number of workpieces machined section", wherein the machining start times of day and machining end times of day of workpieces corresponding to the macro variable values, and the total number of workpieces machined, are written.

When machining result totalization processing is started at step S20, the macro variable value is first read and, at step S21, a determination is made as to whether a numerical value is assigned to the macro variable that was read. If a value is not assigned (macro variable=0), the processing returns to the first step S20 and the above operation is repeated. If a value is assigned (e.g., macro variable=1234), the execution progresses to the next step S23, where the macro variable value is checked against the workpiece name on the basis of the machining result totalization table. A machining start time of day is then set at step S24. At the next step S25, the macro variable value is read and a determination is made at step S26 as to whether or not the macro variable read has been cleared. If it has not yet been cleared (e.g., macro variable=1234), the execution returns to the step S26 for reading the macro variable value and the above operation is repeated until it is judged that the macro variable has been cleared (macro variable=0). If it has been cleared, a machining end time of day is set at step S27 and the number of workpieces machined is incremented by 1 at step S28.

The machining result totalization processing is thus terminated at step S29 and the machining result totalization table is filled. This process allows the periods of time required for machining the workpieces, the operation ratio of the NC machine tool, etc., to be totalized directly and exactly.

FIG. 15A illustrates a flowchart of a conventional operation time display system embodiment and FIG. 15B shows the structure of stored operation times of day as disclosed in Japanese Patent Publication No. 31824 of 1988.

As shown in FIG. 15B, the stored structure of the operation times of day comprises a pointer that designates a currently run program number (PR), operation start time of day (MS) and operation end time of day (ME). The data PR, MS and ME may be stored in a table format.

The sequence of processing will now be described according to the flowchart. Referring to FIG. 15A, whether a cycle start has been switched ON or not is first checked at step S30. If it is determined at step S31 that the cycle start has been switched on, the operation start time of day (MS) is stored at step S32 and automatic operation is initiated at step S33. Whether the automatic operation has been finished or not is then checked at step S34. If it has been finished, the operation end time of day (ME) is stored at step S35 and a pointer (PNTR) is incremented by 1 at step S36. Whether the pointer (PNTR) has exceeded a maximum value or not is then checked at step S37. If it has exceeded the maximum value, the pointer is reset to zero at step S38. If it has not exceeded such value, the execution returns to step S31. The above cycle is repeated with the operation start time of day (MS) and the operation end time of day (ME) stored and displayed.

The above processing permits the operator to understand the machine operation status sufficiently so that production control, process control, etc., at a plant can be conducted.

FIGS. 16A and 16B comprise a processing flowchart of a conventional numerical control unit equipped with maintenance time warning means, as disclosed in Japanese Patent Publication No. 62441 of 1985.

Assume that the periodic inspection time of the numerical control unit is set in a timer T1, the maintenance time, e.g., replacement or inspection time, of specific parts of the numerical control unit is set in timers T2 and T3, and the periodic inspection time and overhaul time of a machine controlled by the numerical control unit is set in timers H1 and H2, respectively.

When the numerical control unit is then powered up at step S40, the timers T1, T2 and T3 count up at their respective predetermine cycles, as shown at Steps S41, S42 and S43 of the processing flowchart in FIG. 16A. In addition, while the machine is driven, as determined at step S44, the timers H1 and H2 count up at their predetermined cycles in Steps S45 and S46. In this manner, the timers T1, T2 and T3 count up while the numerical control unit is operating and the timers H1 and H2 count up while the machine to be controlled is driven.

In the meantime, as shown in FIG. 16B, following a start at step S47, whether the timers T1, T2, T3, H1 and H2 have reached their set values or not is detected at their predetermined cycles as seen at Steps 48A-48E, and any set value reached is displayed and an alarm is issued at Steps 49A-49E.

For example, when the periodic inspection time of the numerical control unit is reached, the timer T1 reaches or exceeds its set value, a message describing the periodic inspection time is issued and warning is displayed. After periodic inspection is performed according to the periodic inspection time information provided by the numerical control unit, the timer T1 is cleared to zero again and the next periodic inspection time is set from a manual input device. The maintenance period warning thus displayed provides ease of maintenance control.

FIG. 17A is a flowchart illustrating part of the processing performed by a conventional numerical control unit equipped with a periodic maintenance message displaying function and a memory map for the storage contents thereof, as disclosed in Japanese Patent Publication No. 241805 of 1986.

FIG. 17B illustrates the memory map showing the storage contents of a nonvolatile memory. As shown therein, the nonvolatile memory includes areas #A1– #An each of which has seven addresses, and areas #C1–#Cn which store data to be displayed. First, addresses of the areas #A1–#An (address a in the area #A1) store data indicating a year among the year, month and day on which maintenance should be performed, second addresses (address a+1 in the area #A1) store data indicating a month among the year, month and day on which maintenance should be performed, third addresses (address a+2 in the area #A1) store data indicating a day among the year, month and day on which maintenance should be performed, fourth addresses (address a+3 in the area #A1) store data indicating a year among the year, month and day indicating a maintenance interval, fifth addresses (address a+4 in the area #A1) store data indicating a month among the year, month and day indicating the maintenance interval, sixth address (address a+5 in the area #A1) store data indicating a day among the year, month and day indicating the maintenance interval, and seventh addresses (address a+6 in the area #A1) store the area numbers of the areas #C1–#Cn storing data to be displayed. The data stored in the areas #C1–#Cn are the maintenance instructions such as "CHANGE THE BATTERY" and "LUBRICATE".

The flowchart in FIG. 17A shows part of the processing, which begins when the numerical control unit is powered up at step S50. First, at step S51 time of day (power-on year, month and day) is read from a clock, the year data among the read time of day is stored into address B, the month data into address B+1, and the day data into address B+2. Then, at step S52, a counter value N of an internal software counter is set to "0" and the operation of (A=a+7 * N) is performed at step S53 in order to find the first address of the area to be referenced. Since N is "0" in this case, A=a which is the first address of the area #A1.

Then a comparison is made at step S54 between the maintenance year, month and day stored in the addresses A, A+1 and A+2 and the power-on year, month and day stored in the addresses B, B+1 and B+2 in order to determine whether the clock is past the maintenance year, month and day. It should be noted that if the maintenance year, month and day match the power-on year, month and day, it will be determined that the clock is past the maintenance year, month and day. When it has been determined that the clock is past the maintenance year, month and day, area number j stored in the address A+6 is read, and maintenance data stored in area #Cj corresponding to said area number j is then read and displayed at step S55 as the maintenance instructions associated with the area #A1. On the other hand, when it has been determined that the clock is not past the maintenance year, month and day, no operation is performed and the processing moves on to step S56, wherein the count value N of the internal software counter is incremented by 1. Here, N is set to "1". Whether the count value N of the internal software counter is n (n indicates the number of areas) or not is then determined at step S57. If N is not n, the processing returns to perform the operation of (A=a+7 * N) at step S53. In this case, since N is "1", A=a+7 which is the first address of the area #A2. A comparison is then made between the maintenance year, month and day stored in the addresses A, A+1 and A+2 and the power-on year, month and day stored in the addresses B, B+1 and B+2 in order to determine whether the clock is past the maintenance year, month and day, and the processing as described above is performed according to the determination result. When the aforementioned processing is performed up to the area #An, N is set to n and the processing advances to step S58. Briefly, the above described processing displays the item(s) of maintenance to be performed on that day.

The operator then carries out maintenance work corresponding to the maintenance item(s) displayed. When the maintenance work is over, the operator enters a command which indicates that the maintenance work is over. On detection of the maintenance termination at step S58, the numerical control unit terminates the processing at step S60. The termination occurs after rewriting at step S59 that data indicating the maintenance year, month and day stored in the first to third addresses of the areas #A1-#An, on the basis of the data indicating the maintenance intervals stored in the fourth to sixth addresses of the areas #A1-#An.

Automation is the best way to achieve labor saving at a plant. However, setup work (such as workpiece installation, centering, tool preparations, etc.), in-machining and post-machining work (such as chip ejection, workpiece cleaning, measurement, workpiece removal, etc.) and machine inspection and maintenance work include many areas which must rely on manpower.

Therefore, labor saving is achieved by making one worker responsible for a plurality of machine tools, who finishes setup on one machine tool and effects its automatic start, then begins the setup of another machine tool. In this case, the worker maps out a work schedule, estimating manual work time of day for each machine from experience. In addition, special considerations are generally given to a machine layout so that the worker may supervise the progress of machining. Accordingly, the number of machine tools which one worker can be in charge of is smaller than that of machine tools calculated from the number of manual work processes required. Further, unexpected waiting time occurs due to the scheduling mistake of the worker, resulting in a productivity reduction.

In the conventional art, the resultant periods of machining time, cutting time, etc. are only collected during actual machining. Machining information on what should be done at what hour and minute is not provided. It is an object of the present invention to improve the working efficiency at machining sites, where one worker is responsible for a plurality of machine tools, by providing the worker machining information on what should be done at what hour and minute. Moreover, the present invention allows several workers to be responsible for a multiplicity of machine tools by specifying work items and times of day, thereby further improving the working efficiency as compared to an instance where responsibility is fixed with enhanced schedule flexibility.

In the conventional maintenance time warning system, a warning is given and machine operation is limited when a certain maintenance and inspection item has reached its maintenance and inspection time so that the practice of maintenance and inspection is encouraged. In actual machine maintenance and inspection work, however, preparatory work and secondary maintenance and inspection work may be required to carry out one maintenance and inspection item. For example, the replacement of a spindle belt calls for the preparatory work of ordering the spindle belt and the secondary inspection work of readjusting tension after 10 hours of operation after the belt replacement. The conventional maintenance time warning cannot provide the worker with sufficient maintenance and inspection work schedule information because such preparatory work and secondary maintenance and inspection work cannot be controlled in connection with the maintenance items.

It is another object of the present invention to provide the worker with sufficient maintenance and inspection work schedule information by controlling the maintenance items in connection with the preparatory work and secondary maintenance and inspection work.

Further, for items such as lubricant tank oil level check and chuck lubrication, some of the maintenance and inspection work has a short inspection interval, e.g., about eight hours. With respect to such maintenance and inspection items, the conventional maintenance time warning identifies the remaining time until the maintenance and inspection work must be carried out. In some operation schedules, however, the current time of day plus the remaining time up to the maintenance and inspection work is not always the scheduled time of day for the maintenance and inspection. For this reason, scheduled maintenance and inspection time of day cannot be pre-announced correctly.

It is further object of the present invention to provide a numerical control unit and method of unit operation which pre-announces scheduled maintenance and inspection time of day with high accuracy in consideration of an operation schedule.

SUMMARY OF THE INVENTION

The numerical control unit which comprises the present invention and accomplishes the above identified objects comprises structures and processing which can pre-process information required for the control and monitoring of the performance of the unit, can automatically start-up the control and monitoring of the programmed operation of the unit and can predict and update the predicted scheduling and performance of selected events related to the operation and maintenance of the unit.

The numerical control unit of the present invention includes the steps of, and apparatus for setting the expected run time of a machining command program and/or the expected run time from the start of the machining command program to the execution of at least one or more specific commands in the machining command program and for generating an expected run end time of day and/or expected specific command execution time of day.

The numerical control unit of the present invention includes the steps of, and apparatus for storing at least one or more pieces of inspection awaiting information, such inspection awaiting information including at least inspection items, inspection intervals, inspection awaiting start time of day, and related inspection awaiting information link data, for storing one or more scheduled run start times of day and scheduled run end times of day and for estimating next scheduled inspection time of day from the inspection awaiting information and run schedule.

The present invention allows expected run end time of day and/or expected specific command execution time of day to be estimated from the expected run time of the machining command program and/or the expected run time from the start of the machining command program to the execution of at least one or more specific commands.

The present invention allows a related inspection item to be waiting for inspection when a certain inspection item is awaiting inspection.

In addition, the present invention allows the scheduled inspection times of day of such inspection items awaiting inspection to be estimated in consideration of a run schedule.

The present invention provides for the storage of appropriate messages related to the performance of maintenance, inspection, and operational functions related to the numerical control unit and to access those messages at appropriate times in consideration of the actual operation of the unit under program control.

BRIEF DESCRIPTION OF THE DRAWINGS

FIG. 2B illustrates a time memory table created by the pre-processing and its associated message memory table.

FIG. 4A illustrates an expected TOD memory table and a resultant TOD memory table created by the automatic start-up processing.

FIG. 4B provides examples of a pre-announcement message, an arrival message, expected time of day and resultant time of day displayed on a CRT/MDI unit.

FIGS. 6, 6A, and 6B show a structure of an inspection awaiting information memory table according to an embodiment of the present invention.

FIGS. 7, 7A, and 7B illustrate structures of a run schedule memory and a run result memory according to an embodiment of the present invention.

FIG. 8A gives examples of the run schedule memory and the run result memory displayed on the CRT/MDI unit according to an embodiment of the present invention.

FIG. 8B gives examples of the inspection awaiting information memory table displayed on the CRT/MDI unit according to an embodiment of the present invention.

FIG. 13 is a flowchart illustrating the processing of a conventional programmable controller embodiment having a clock function, as disclosed in Japanese Patent Publication No. 139802 of 1986.

DESCRIPTION OF THE PREFERRED EMBODIMENTS

An embodiment of the present invention will now be described with reference to the accompanying drawings. As will be clear to one of ordinary skill, while the described embodiment relates to a machine whose machining of a workpiece proceeds according to certain programmed operations and generates certain machined products and performs certain machining functions, such as generating machining chip waste, the invention is not limited thereto.

Figure 1:
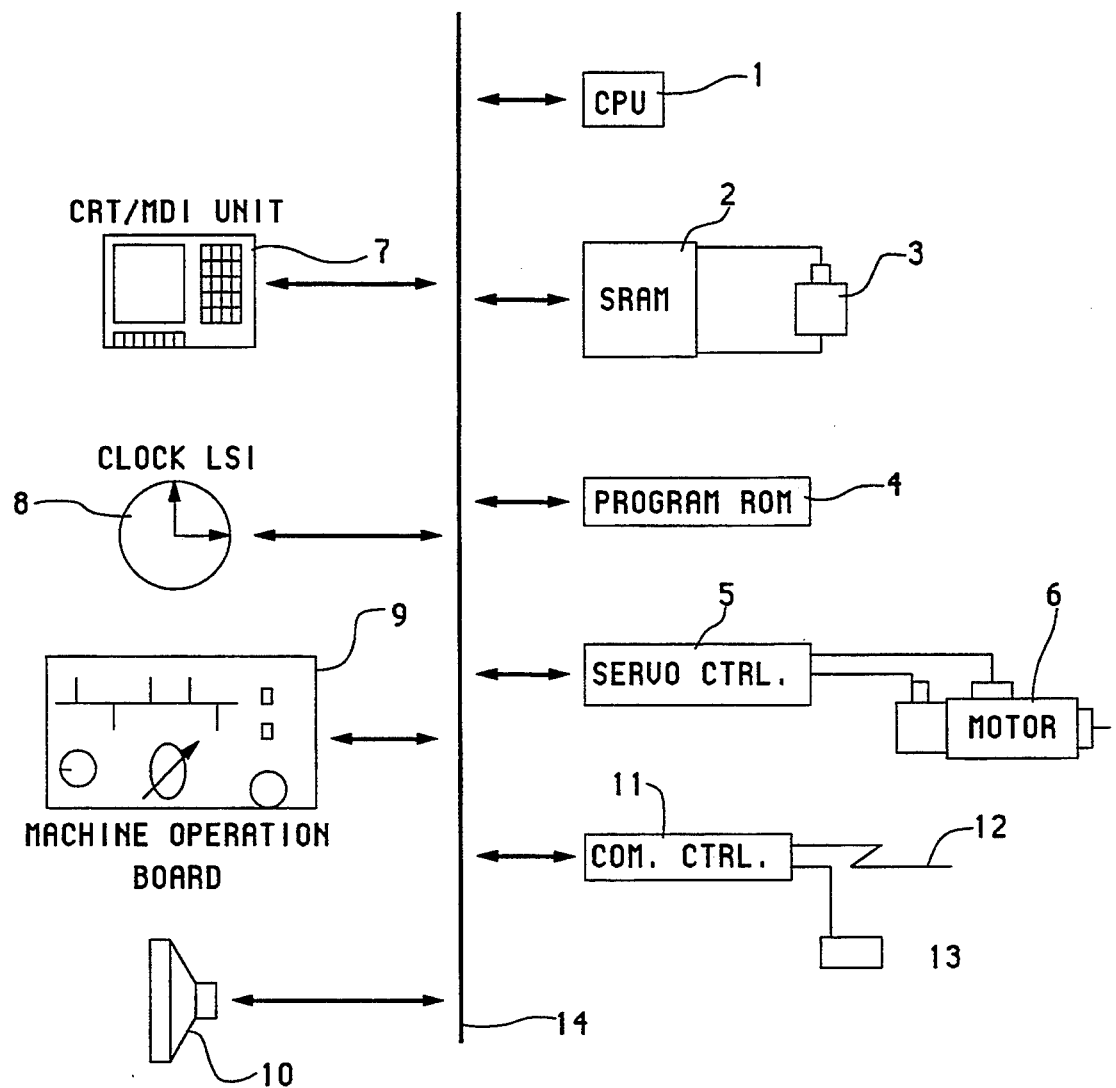
FIG. 1 is a block diagram of a numerical control unit concerned with an embodiment of the present invention.

FIG. 1 is a block diagram of a numerical control unit concerned with the embodiment of the present invention, wherein a microprocessor CPU 1 is built in the numerical control unit for executing a command according to a control program written on a ROM 4, reading time of day from a clock LSI 8, transferring data to and from a SRAM 2, receiving signals from a display/input unit (CRT/MDI) 7 and a machine operation board 9 for machine control, delivering commands to a servo control unit 5 for machining locus control, transmitting data to the CRT/MDI unit 7 so as to display it thereon, generating a voice signal by sending a command to a voice output device 10, delivering various data by sending data to a communication control unit 11, and receiving data from the communication control unit 11 through a communication line 12 and a modem 13.

SRAM 2 is an accessible memory backed by a battery 3 that allows information, such as machining command programs and operation start time of day, to be stored. Moreover, the battery-backed SRAM 2 can keep previous data when the power of the numerical control unit is off.

Figure 2A:
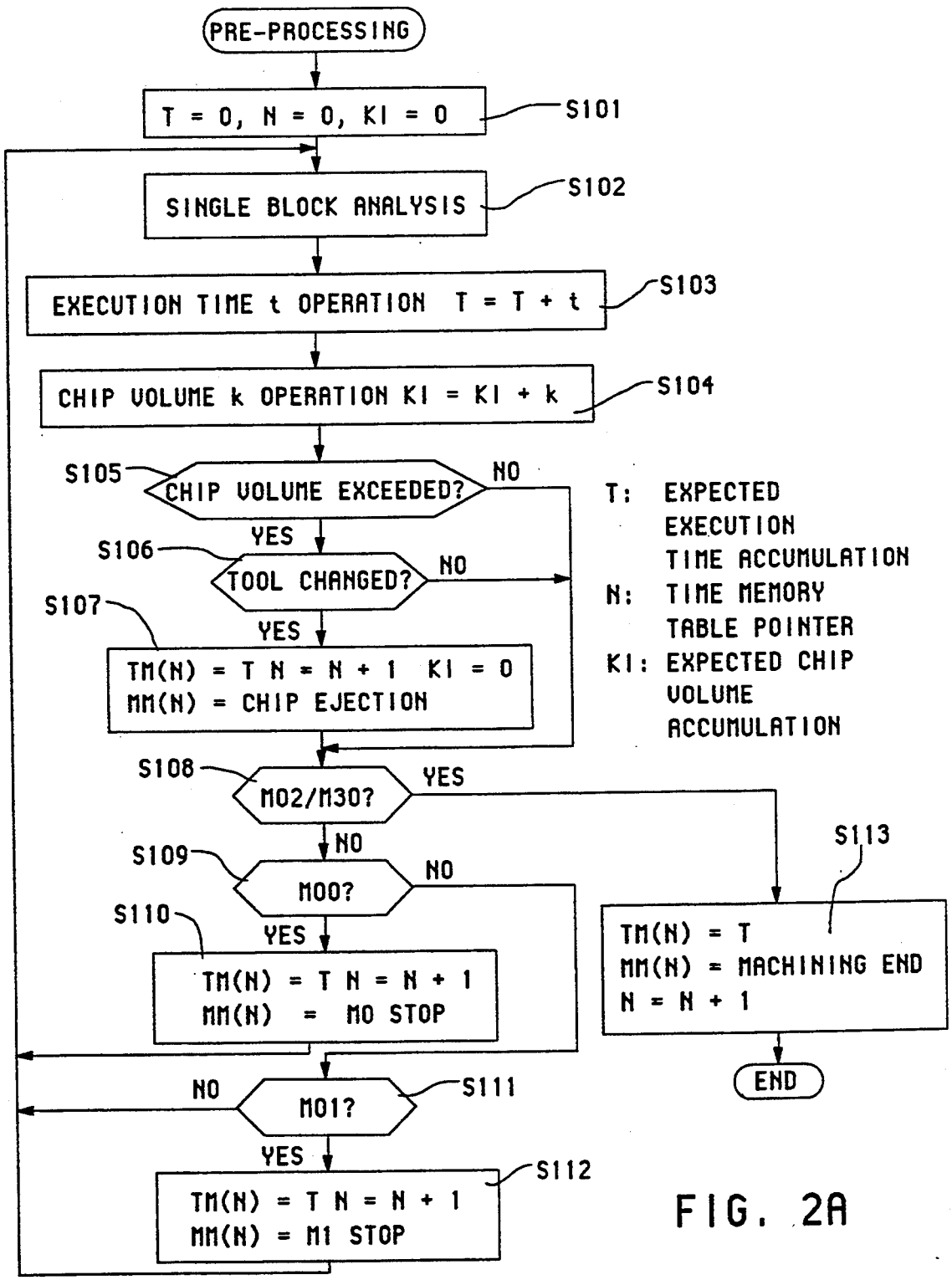
FIG. 2A is a flowchart of pre-processing in accordance with an embodiment of the present invention.

FIG. 2A is a pre-processing flowchart for the embodiment of the present invention, and FIG. 2B illustrates a time memory table created by the pre-processing and a corresponding message memory table.

The pre-processing is executed at an arbitrary pre-machining point, e.g., at the time of machining command program search of machining command program input, for creating the time memory table and the message memory table.

The pre-processing will now be described with reference to FIGS. 2A and 2B.

Step 101: when the pre-processing is started, data is first initialized, i.e., expected execution time accumulation (T), time memory table pointer (N) and expected chip volume accumulation (KI) are cleared to zero.

Step 102: One block of the machining command program is then analyzed, and a travel mode, a travel distance (L), a travel speed (F) and a miscellaneous function code (M) are output.

Step 103: Based on the output of the preceding step, the expected execution time (t) of the block is operated on. For example, if the travel mode is cutting feed, the operation of (t=L÷F) is performed, and if the travel mode is rapid traverse, the operation of (t=L÷F+acceleration/deceleration constant) is performed. The expected execution time (t) of the block is then added to the expected execution time accumulation (T) to update the expected execution time accumulation (T).

Step 104: An expected chip volume (k) of the block is then operated on. For example, if the travel mode is cutting feed, the operation of (k=depth of cut×L) is performed, and if the travel mode is not Cutting feed, k is set to 0. The expected chip volume (k) of the block is then added to the expected chip volume accumulation (KI) to update the expected chip volume accumulation (KI).

Step 105: An ejected chip volume (Kmax) set beforehand by ejected chip volume setting means, such as the CRT/MDI unit 7, to an ejected chip volume memory in the SRAM 2 is then compared with the expected chip volume accumulation (KI). If the expected chip volume accumulation (KI) is equal to or greater than the ejected chip volume (Kmax), the processing moves on to step 106. If the expected chip volume accumulation (KI) is less than the ejected chip volume (Kmax), the processing branches to step 108.

Step 106: Whether the block is a tool change command or not is then checked. If the miscellaneous function code (M) output at the step 102 is 6, the block is a tool change command and the processing proceeds to step 107. If M is not 6, the processing Jumps to step 108.

Step 107: The expected execution time accumulation (T) is stored into the Nth area (TM(N)) of the time memory table, a message "CHIP EJECTION" is stored into the Nth area (MM(N)) of the message memory table, and the time memory table pointer (N) is advanced by 1. Further, the expected chip volume accumulation (KI) is cleared to zero.

Step 108: Whether the block is a run end command or not is then checked. If the miscellaneous function code (M) output at the step 102 is 2 or 30, the block is a run end command. If M is 2 or 30, the processing branches to step 113. Otherwise, the processing advances to step 109.

Step 109: Whether the block is a program stop command or not is then checked. If the miscellaneous function code (M) output at the step 102 is 0, the block is a program stop command and the processing moves to step 110. If M is not 0, the processing jumps to step 111.

Step 110: The expected execution time accumulation (T) is stored into the Nth area (TM(N)) of the time memory table, a message 'M0 STOP' is stored into the Nth area (MM(N)) of the message memory table, and the time memory table pointer (N) is advanced by 1. The processing then branches to the step 102 to perform the processing of the next block.

Step 111: Whether the block is an optional program stop command or not is then checked. If the miscellaneous function code (M) output at the step 102 is 1, the block is an optional program stop command and the processing proceeds to step 112. If M is not 1, the processing jumps to the step 102 to perform the next block processing.

Step 112: The expected execution time accumulation (T) is stored into the Nth area (TM(N)) of the time memory table, a message "M1 STOP" is stored into the Nth area (MM(N)) of the message memory table, and the time memory table pointer (N) is advanced by 1. The processing then branches to the step 102 to perform the next block processing.

As described above, block-by-block processing soon executes the run end command block, M is judged as 2 or 30 at the step 108, and the processing jumps to step 113.

Step 113: The expected execution time accumulation (T) is stored into the Nth area (TM(N)) of the time memory table, a message "MACHINING END" is stored into the Nth area (MM(N)) of the memory table, and the time memory table pointer (N) is advanced by 1.

As mentioned above, the step 102 in the pre-processing corresponds to machining command program analyzing means.

The step 103 corresponds to expected execution time operating means and expected execution time accumulating means.

The step 104 corresponds to expected chip volume operating means and expected chip volume accumulating means.

The Steps 105 and 106 correspond to ejection block specifying means.

The Steps 107, 110, 112 and 113 correspond to expected run time setting means and message setting means.

The step 108 corresponds to run end command determining means.

The step 109 corresponds to program stop command determining means.

The step 111 corresponds to optional program stop command determining means.

When the pre-processing is executed as described above, the time memory table and message memory table associated with the machining command program to be run are created.

FIG. 2B provides examples of such tables, indicating that "M0 STOP" (MM(0)) will be executed 10 minutes and 00 seconds (TM(0)) after the run starts. Similarly, the tables indicate that "M1 STOP" (MM(1)) will be effected 15 minutes and 30 seconds (TM(1)) after the run starts, "CHIP EJECTION" (MM(2)) is scheduled to take place 30 minutes and 45 seconds (TM(2)) after the run starts, "M1 STOP" (MM(3)) will be effected 45 minutes and 00 seconds (TM(3)) after the run starts, "CHIP EJECTION" (MM(4)) is scheduled to be made 1 hour, 00 minutes and 02 seconds (TM(4)) after the run starts, "M0 STOP" (MM(5)) will be executed 1 hour, 12 minutes and 21 seconds (TM(5)) after the run starts, and ultimately "MACHINING END" (MM(N−1)) will results 2 hours, 34 minutes and 56 seconds (TM(N−1)) after the run starts.

Figure 3A:
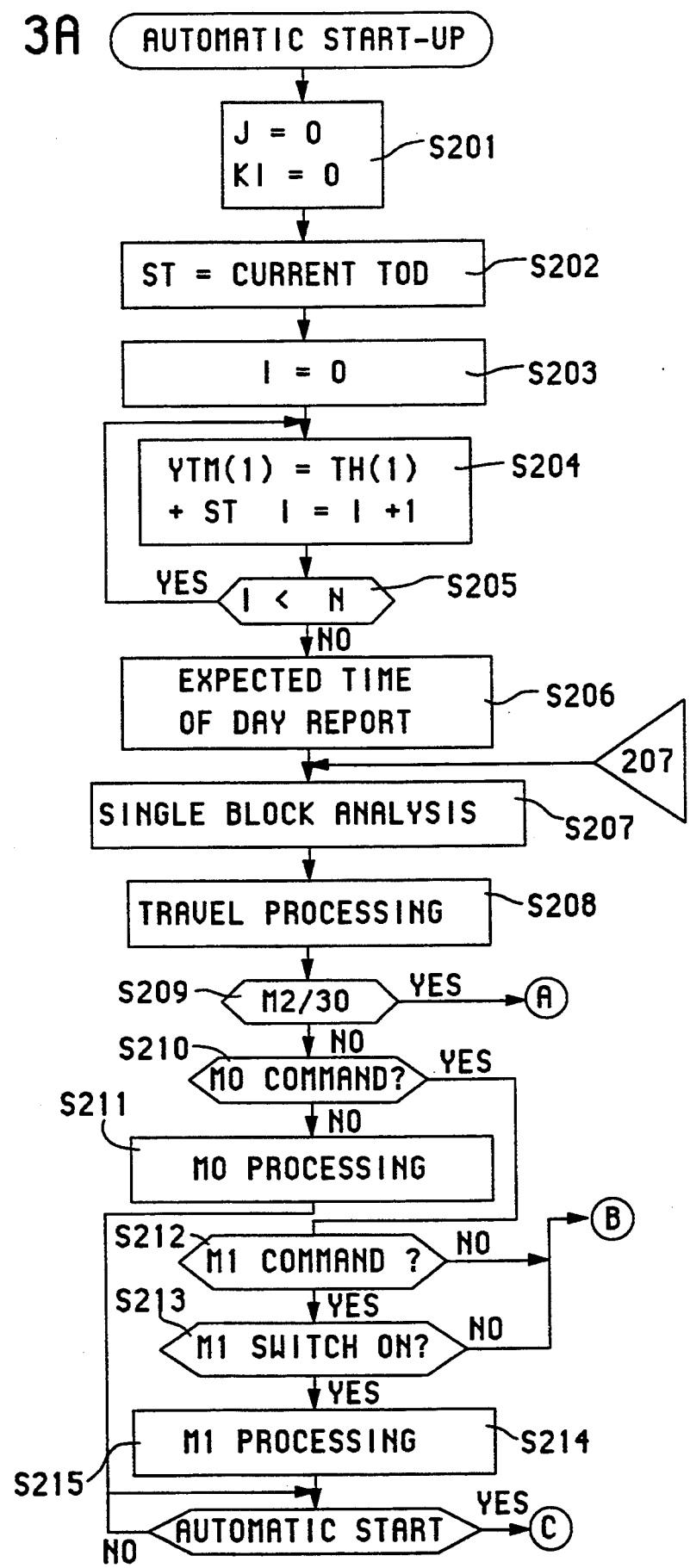
FIGS. 3A, 3B and 3C are a flowchart of automatic start-up processing according to an embodiment of the present invention.
Figure 3B:
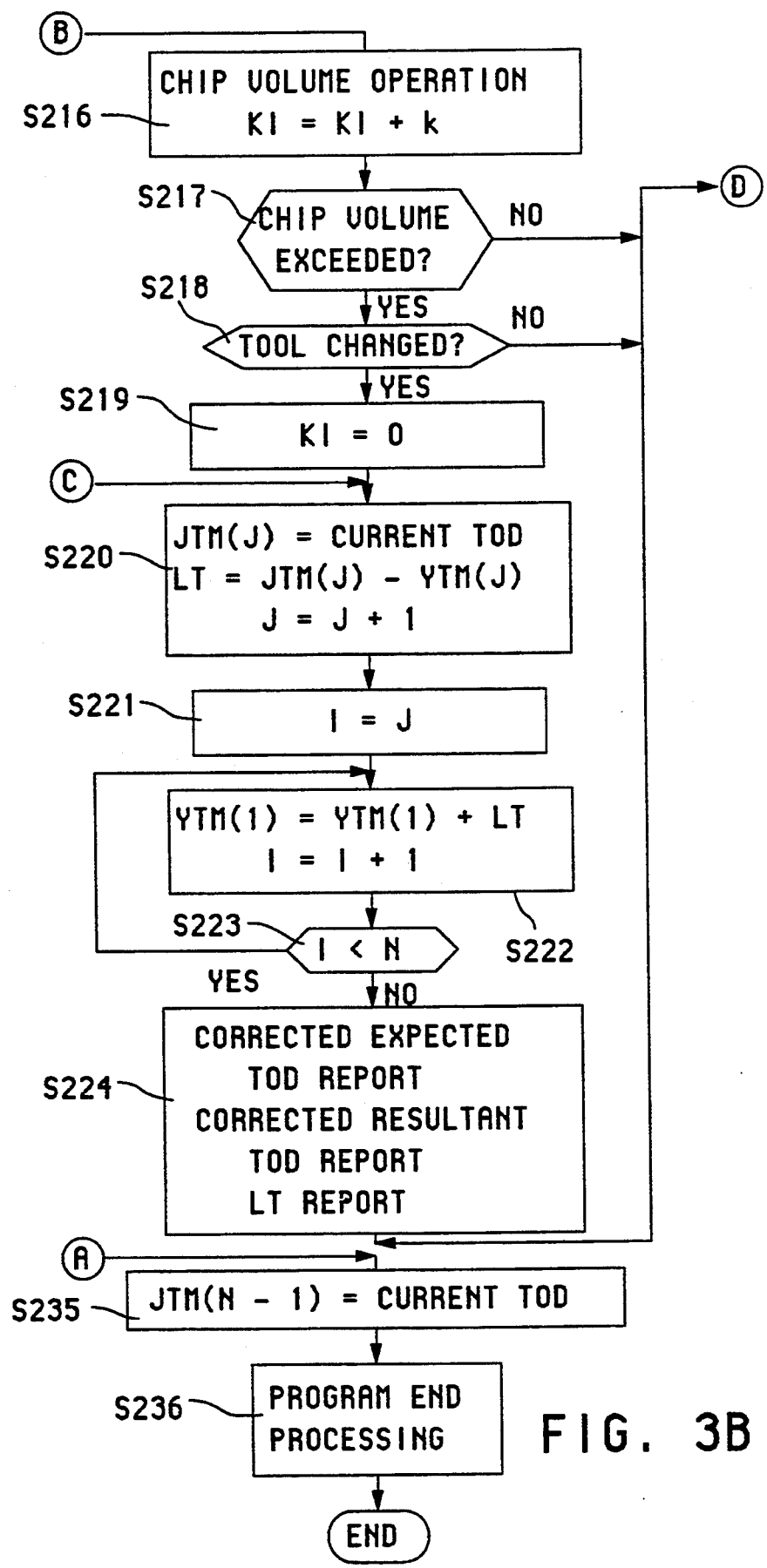
Figure 3C:
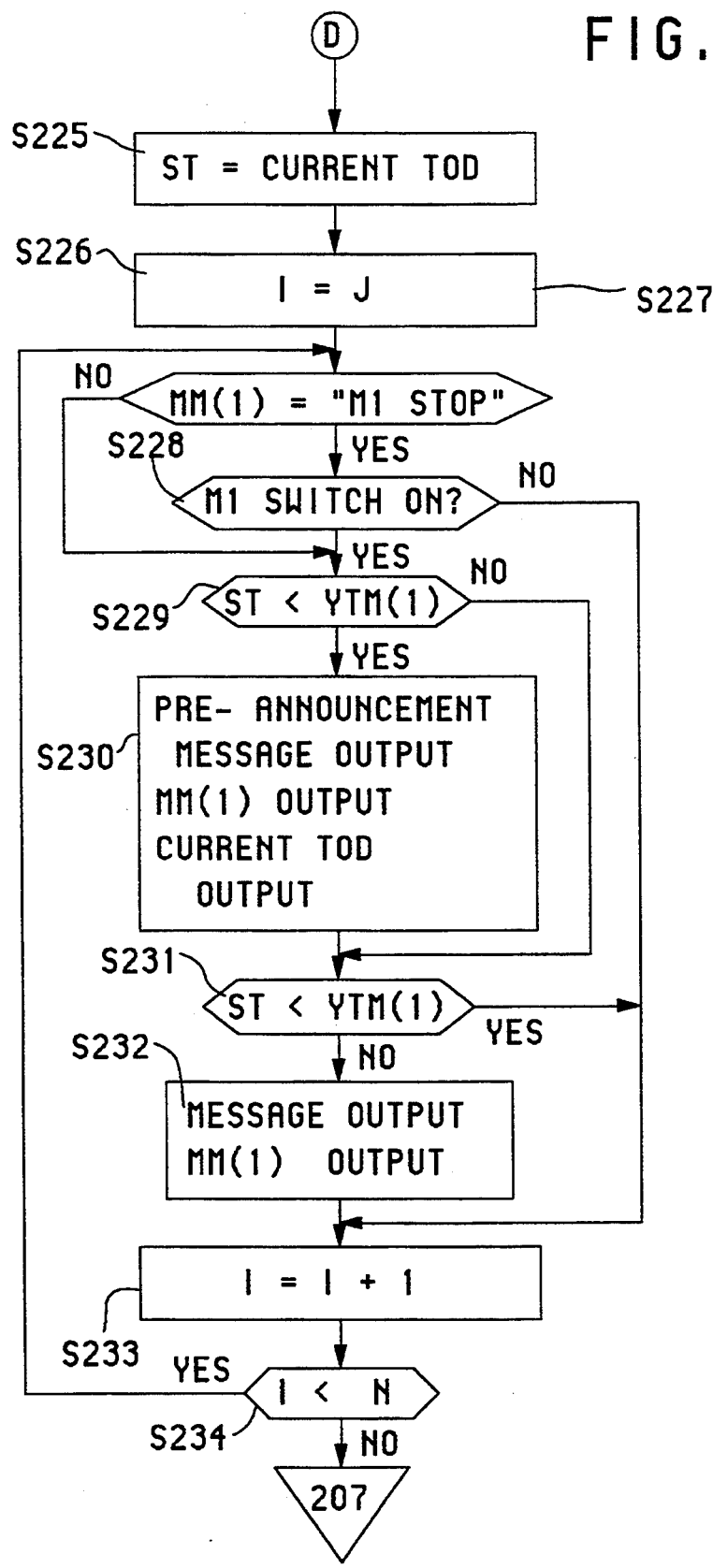

FIG. 3 is a flowchart of automatic start-up processing according to an embodiment of the present invention, FIG. 4A shows an expected time of day (TOD) memory table and a resultant TOD memory table created by the automatic start-up processing, and FIG. 4B gives examples of a pre-announcement message, an arrival message, expected time of day, and resultant time of day displayed on the CRT/MDI unit 7.

The automatic start-up processing is initiated simultaneously with an automatic start and is terminated when the automatic run ends.

The automatic start-up processing will now be described in reference to FIGS. 3, 4A and 4B.

Step 201: When the start-up processing is initiated, data is first initialized, i.e., a resultant TOD pointer (J)

and the expected chip volume accumulation (KI) are cleared to zero.

Step 202: The current time of day is then read and its value is stored into a register memory (ST).

Step 203: A temporary pointer (I) is set to 0.

Step 204: Expected execution time of day is calculated by adding the current time of day value stored into the register memory (ST) at the step 202 to the data (TM(I)) in an Ith area of the time memory table, and is stored into an Ith area (YTM(I)) of the expected TOD memory table. The temporary pointer (I) is then advanced by 1.

Step 205: The temporary pointer (I) is compared with a time memory table size (N) determined in the preprocessing. If I is smaller than N, the step 204 is repeated and N pieces of expected time of day are set to the expected TOD memory table. When I has become not less than N, the processing proceeds to step 206.

Step 206: The expected TOD memory table and the message memory table set in the preceding steps are displayed on the CRT/MDI unit 7, and at the same time, the expected TOD memory table and the message memory table are delivered to the communication devices, such as a host computer, through the communication control unit 11 and the communication line 12.

Step 207: As at the step 102 in FIG. 2A, one block of the machining command program is analyzed.

Step 208: On the basis of the analysis data, interpolation processing is performed and machine travel is conducted.

Step 209: Whether the block is a run end command or not is checked. The block is a run end command if the miscellaneous function code (M) output at the step 207 is 2 or 30. If M is 2 or 30, the processing jumps to step 235. Otherwise, the processing advances to step 210.

Step 210: Whether the block is a block stop command or not is checked. The block is a block stop command if the miscellaneous function code (M) output at the step 207 is 0. If M is 0, M0 processing, e.g., waiting for a machine stop, is performed at step 211 and the processing branches to step 215. If M is not 0, the processing jumps to step 215.

Step 212: Whether the block is an optional block stop command or not is checked. The block is an optional block stop command if the miscellaneous function code (M) output at the step 207 is 1.

If M is 1, the on/off of an optional block stop switch is judged at step 213. If the switch is on, M1 processing, e.g., waiting for a machine stop, is performed at step 214, an automatic start signal is awaited at step 215, and the processing branches to step 220 when the automatic start is effected. If M is not 1 at the step 212 or if the switch is off at the step 213, the processing goes to step 216.

Step 216: As at the step 104 in FIG. 2A the expected chip volume (k) and the expected chip volume accumulation (KI) of said block are operated on.

Step 217: As at the step 105 in FIG. 2A, whether the expected chip volume accumulation (KI) of the block is exceeded or not is then checked. If it is not exceeded, the processing branches to step 225.

Step 218: Whether the block is a tool change command or not is then checked. The block is a tool change command if the miscellaneous function code (M) output at the step 207 is 6. If M is not 6, the processing jumps to step 215.

Step 219: If M is 6, the expected chip volume accumulation (KI) is cleared to zero.

Step 220: The resultant time of day is then set to the resultant TOD memory table. The current time of day is read as the resultant time of day and set to a Jth area (JTM(J)) of the resultant TOD memory table.

The value in a Jth area (YTM(J)) of the expected TOD memory table is then subtracted from the Jth area (JTM(J)) of the resultant TOD memory table to calculate expected error time (LT).

The resultant TOD memory table pointer (J) is then advanced by 1.

The J value is set to the temporary pointer (I) to update the expected time of day beginning with the one indicated by the resultant TOD memory table pointer (J).

Step 222: The expected error time (LT) is added to the Ith value (YTM(I)) of the expected TOD memory table, thereby updating the Ith value (YTM(I)) of the expected TOD memory table. The temporary pointer (I) is then advanced by 1.

Step 223: The temporary pointer (I) is compared with the time memory table size (N) determined in the preprocessing. If I is smaller than N, the step 222 is repeated so that the expected times of day of unexecuted Jth to (N−1)th commands can be updated. When I has become not less than N, the processing proceeds to step 224.

Step 224: The expected TOD memory table and the message memory table corrected at the above steps and the resultant TOD memory table and the expected error time (LT) set at the above steps are displayed on the CRT/MDI unit 7, and at the same time, the data is delivered to the communication devices, such as a host computer, through the communication control unit 11 and the communication line 12.

Step 225: The current time of day is read and set to the register memory (ST) to check whether or not the time of day when an arrival message or an arrival pre-announcement message is output has been reached.

Step 226: The value of the resultant TOD memory table pointer (J) is set to the temporary pointer (I) to compare the expected times of day of the unexecuted commands with the current time of day (ST).

Step 227: Whether the message in the Ith area (MM(I)) of the message memory table is "M1 STOP" or not is checked. If it is not "M1 STOP", the processing branches to step 229.

Step 228: If the message is "M1 STOP" at the preceding step, then whether the optional block stop switch is on or not is checked. If the optional block stop switch is not on, the processing jumps to step 233.

Step 229: Pre-announced time (YT) set beforehand in a pre-announcement memory in the SRAM 2 by pre-announcement time setting means, such as the CRT/MDI unit 7, is read, and pre-announced time of day (YTM(I)-YT) is compared with the current time of day (ST) in order to check whether the current time of day is past the pre-announced time of day in the Ith area (YTM(I)) of the expected TOD memory table.

If the current time of day is earlier than the pre-announced time of day, the processing branches to step 231. If the current time of day is past the pre-announced time of day, the processing moves to the next step.

Step 230: A message, for example, a pre-announcement message like "PRE-ANNOUNCEMENT:", the message (MM(I)), the pre-announced time (YT), the expected time (YTM(I)) and the current time of day (ST), are displayed on the CRT/MDI unit 7. At the same time, they are delivered to the communication devices, such as the host Computer, through the communication control unit 11 and the communication line 12, and given to the operator through the modem 13 over the telephone line, or through the voice output device 10 by means of a voice.

Step 231: The current time of day (ST) is then compared with the expected time of day (YTM(I)). If the current time of day is earlier than the expected time of day, the processing jumps to step 233. If the current time of day is past the expected time of day, the processing advances to the next step.

Step 232: Messages, for example, an arrival message like "ARRIVAL:", the message (MM(I)) and the current time of day (ST), are displayed on the CRT/MDI unit 7. At the same time, they are delivered to the communication devices, such as the host computer, through the communication control unit 11 and the communication line 12, and given to the operator through the modem 13 over the telephone line, or through the voice output device (10) by means of a voice.

Step 233: The temporary pointer (I) is advanced by 1.

Step 234: The temporary pointer (I) is compared with the time memory table size (N) determined in the pre-processing. If I is less than N, the processing is repeated from the step 227 onward whereby the pre-announced time of day and expected time of day arrival can be checked as to all expected times of day in and after the Jth area. When I has become not less than N, the processing jumps to the step 207, thereby processing the next block.

By program execution, as described above, block-by-block processing soon executes the run end command block, M is judged as 2 or 30 at the step 209, and the processing branches to step 235.

Step 235: The current time of day is stored into the final data area (JTM(N−1)) of the resultant TOD memory table.

Step 236: The program run end processing, such as waiting for machine travel stop and reset, is performed to terminate the automatic start-up processing.

As described above, the step 202 in the automatic start-up processing corresponds to TOD reading means.

The step 204 corresponds to TOD operating means and expected TOD setting means.

The step 206 corresponds to displaying means and reporting means.

The step 209 corresponds to means for determining whether the run end command has been executed.

The step 215 corresponds to automatic start detecting means and means for determining whether the next command has been started.

The step 220 corresponds to resultant TOD setting means and expected error time operating means.

The step 222 corresponds to expected TOD updating means.

The step 224 includes expected error time displaying means.

The step 229 corresponds to expected TOD operating means and TOD comparing means.

The step 230 corresponds to reporting means for reporting the arrival of the expected time of day.

The step 231 corresponds to TOD comparing means.

The step 232 corresponds to reporting means for reporting the arrival of the expected time of day.

When the automatic start-up processing is performed as described above, the expected TOD memory table and the resultant TOD memory table are created. FIG. 4A gives examples thereof, illustrating the expected TOD memory table created on the basis of the time memory table in FIG. 2B and the resultant TOD memory table created on the basis of the run results, when the run is started at 10 o'clock, 00 minutes and 00 seconds.

Although "M0 STOP" was expected to occur at 10 o'clock, 10 minutes and 00 seconds (YTM(0)), it actually took place at 10 o'clock, 10 minutes and 15 seconds (JTM(0)). Hence, the subsequent expectations are each shifted 15 second, e.g., "M1 STOP" initially expected to occur at 10 o'clock, 15 seconds and 30 seconds has been corrected to 10 o'clock, 15 seconds and 45 seconds (YTM(1)). The other resultant times of day are not yet set.

FIG. 4B provides an example of the above status displayed on the CRT/MDI unit 7.

The message memory table, the expected TOD memory table and the resultant TOD memory table are displayed in that sequence and the expected error time is displayed to their right.

The messages are displayed at the top of the screen, showing the pre-announcement message, pre-announced time (WITHIN 3 MINUTES) and message-generated time of day for "M1 STOP" at 10 o'clock, 15 minutes and 45 seconds.

It should be noted that the processing divided into the pre-processing and the automatic start-up processing in the present embodiment may be split in several other ways.

For example, it will be recognized that the steps 201 to 206 in the automatic start-up processing may be executed at the end of the pre-processing. In this case, the time of day set at the step 202 is not the current time of day but scheduled start time of day.

In addition, it will be appreciated that the single-block analysis processing and the travel processing incorporated in the automatic start-up processing and performed sequentially may be changed into separate tasks and processed concurrently, and the automatic start-up processing may be started cyclically. In this case, the pre-announcement and the scheduled time of day arrival messages may be output at the time of day other than in the joints of the blocks.

Figure 5:
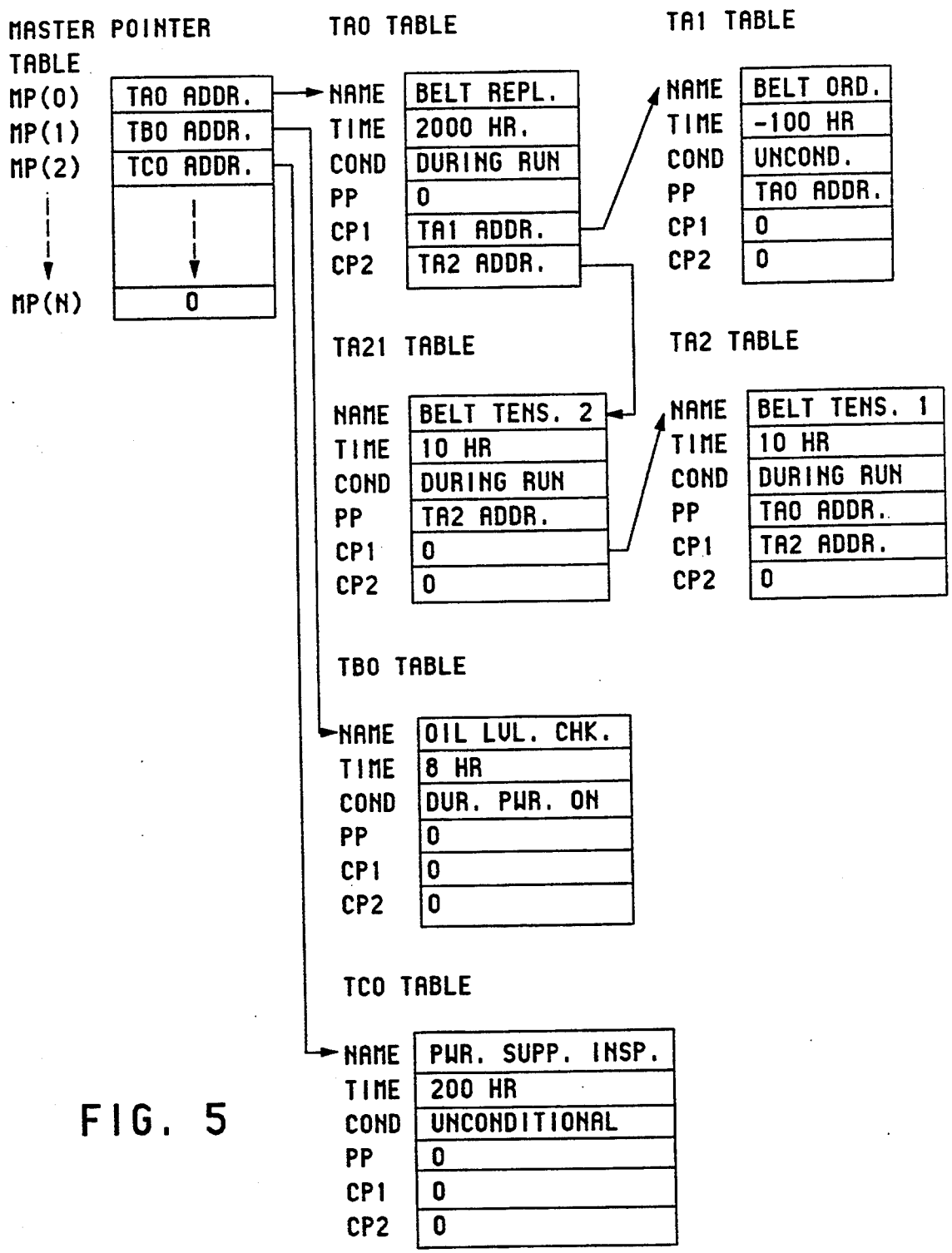
FIG. 5 illustrates a structure of an inspection information memory table according to an embodiment of the present invention.

FIG. 5 shows a structure of an inspection information memory table in accordance with the embodiment of the present invention. The inspection information memory table includes data stored in the SRAM 2 and can be accessed for setting and deletion from the CRT/MDI unit 7.

Inspection information includes inspection items and fundamental information such as inspection intervals related to the inspection items. The inspection information in the inspection information memory table is copied to create an inspection awaiting information memory table.

Referring to FIG. 5, a master pointer table includes an array of pointers indicating the addresses of the most significant inspection information. In the master pointer table, N pieces of the most significant inspection information, MP (0) to MP (N−1), can be registered. The maximum number of pieces of inspection information (N) is a certain fixed value defined by the system.

For example, a first master pointer (MP(0)) indicates the inspection information on "BELT REPLACEMENT".

One piece of inspection information consists of an inspection item (NAME), an inspection interval (TIME), an inspection interval condition (COND), a parent inspection information pointer (PP), a child inspection information pointer 1 (CP1) and a child inspection information pointer 2 (CP2); the terms "parent" and "child" in this context being well known in the related art.

The inspection information on "BELT REPLACEMENT" indicates that its inspection item is the "BELT REPLACEMENT" and the "BELT REPLACEMENT" must be made per 2000 hours of run. In addition, it has two pieces of child inspection information as related inspection information, i.e., "BELT ORDERING" and "BELT TENSION 1".

The inspection information on "BELT ORDERING" indicates that its inspection item is the "BELT ORDERING", its parent inspection information is the "BELT REPLACEMENT", and the "BELT ORDERING" must be unconditionally carried out 100 hours before the "BELT REPLACEMENT". Both the child inspection information pointer 1 (CP1) and the child inspection information pointer 2 (CP2) are 0, indicating that there is no further child inspection information.

The inspection information on "BELT TENSION 1" indicates that its inspection item is the "BELT TENSION 1", its parent inspection information is the "BELT REPLACEMENT", and the "BELT TENSION 1" must be adjusted 10 hours after the "BELT REPLACEMENT". It also has the further child inspection information, "BELT TENSION 2".

The inspection information on "BELT TENSION 2" indicates that its inspection item is the "BELT TENSION 2", its parent inspection information is the "BELT TENSION 1", and the "BELT TENSION 2" must be adjusted 10 hours of run after the adjustment of the "BELT TENSION 1". Both the child inspection information pointer 1 (CP1) and the child inspection information pointer 2 (CP2) are 0, indicating that there is no further child inspection information.

As described above, the hierarchical table configuration represents a sequence of inspection work that in the inspection item wherein the belt replacement is made per 2000 hours of run, the belt ordering is performed 100 hours before the belt replacement, the belt tension is adjusted 10 hours of run after the belt replacement, and the belt tension is adjusted in further 10 hours of run.

A second master pointer (MP(1)) indicates inspection information on "OIL LEVER CHECK". The inspection information on "OIL LEVER CHECK" indicates that its inspection item is the "OIL LEVER CHECK" and the "OIL LEVER CHECK" must be made every time the power-on time elapses eighth hours. The child inspection information pointer 1 (CP1) and the child inspection information pointer 2 (CP2) are both 0, indicating that there is no child inspection information.

A third master pointer (MP(2)) indicates inspection information on "POWER SUPPLY INSPECTION". The inspection information on "POWER SUPPLY INSPECTION" indicates that its inspection item is the "POWER SUPPLY INSPECTION" and the "POWER SUPPLY INSPECTION" must be carried out unconditionally every 200 hours. The child inspection information pointer 1 (CP1) and the child inspection information pointer 2 (CP2) are both 0, indicating that there is no child inspection information.

Figure 6B:
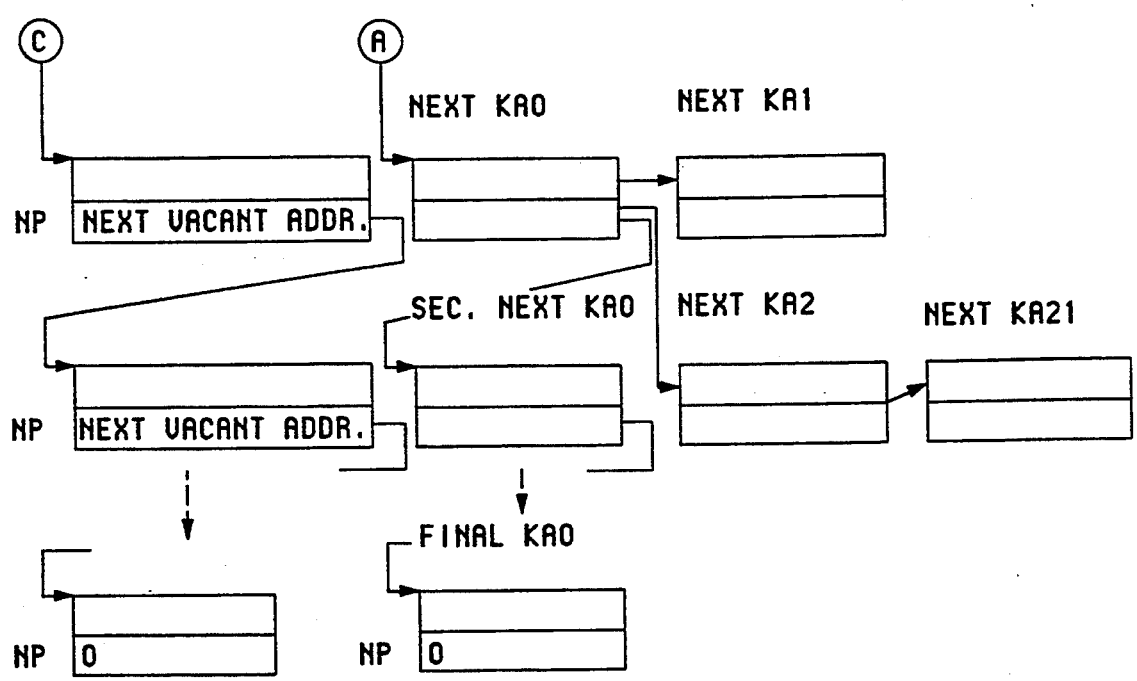

FIG. 6 illustrates a structure of an inspection awaiting information memory table in accordance with an embodiment of the present invention. The inspection awaiting information memory table includes information for managing the history and schedule of inspection and is stored in the SRAM 2.

Referring to FIG. 6, a current pointer table is identical in structure to the master pointer table in FIG. 5 and includes an array of pointers indicating the addresses of the most significant inspection awaiting information. In the current pointer table, N pieces of the most significant inspection awaiting information, KP(0) to KP(N−1), can be registered. Further, a pointer indicating a vacant inspection awaiting information table address has been registered into KP(N) to ensure efficient registration and deletion of the inspection awaiting information.

For example, a first current pointer (KP(0)) indicated the inspection awaiting information on "BELT REPLACEMENT".

One piece of inspection awaiting information consists of an inspection item (NAME), an inspection interval (TIME), an inspection interval condition (COND), a parent inspection information pointer (PP), a child inspection information pointer 1 (CP1), a child inspection information pointer 2 (CP2), inspection awaiting start time of day (ST), next scheduled inspection time of day (ET), resultant inspection time of day (JT) and a next inspection awaiting information pointer (NP).

The inspection awaiting information on "BELT REPLACEMENT" indicates that its inspection item is the "BELT REPLACEMENT" and the "BELT REPLACEMENT" must be made per 2000 hours of run. Further, it represents that inspection awaiting begins at 12 o'clock on Feb. 1, 1991, the next scheduled inspection time of day is 16 o'clock on Sep. 20, 1991, and since the resultant inspection time of day (JT) is 0, the inspection at 16 o'clock on Sep. 20, 1991 has not yet been performed.

In addition, the inspection awaiting information has two pieces of child inspection information as related inspection information, i.e., "BELT ORDERING" and "BELT TENSION 1". Further, since the next inspection awaiting information pointer (NP) has been set, it can be seen that the next inspection awaiting information has already been registered. The next inspection awaiting information is identical in contents to the inspection awaiting information, but the next scheduled inspection time of day (ET) of the inspection awaiting information has been set to the inspection awaiting start time of day (ST) of the next inspection awaiting information, and the next scheduled inspection time of day (ET) of the next inspection awaiting information indicates second next scheduled inspection time of day.

The inspection information on "BELT ORDERING" indicates that its inspection item is the "BELT ORDERING", its parent inspection information is the "BELT REPLACEMENT", and the "BELT ORDERING" must be carried out unconditionally 100 hours before the "BELT REPLACEMENT". In addition, it indicates that inspection awaiting begins at the next scheduled inspection time of day (ET) for the "BELT REPLACEMENT", i.e., 16 o'clock on Sep. 20, 1991, and the "BELT ORDERING" was conducted at 12 o'clock on Sep. 16, 1991. Further, both the child inspection information pointer 1 (CP1) and the child inspection information pointer 2 (CP2) are 0, indicating that there is no child inspection information.

The inspection information on "BELT TENSION 1" indicates that its inspection item is the "BELT TENSION 1", its parent inspection information is the "BELT REPLACEMENT", and the "BELT TENSION 1" must be adjusted 10 hours of run after the "BELT REPLACEMENT". Further, it indicates that inspection awaiting begins at the next scheduled inspection time of day (ET) for the "BELT REPLACEMENT", i.e., 16 o'clock on Sep. 20, 1991, the next scheduled inspection time of day is 16 o'clock on Sep. 22, 1991, and since the resultant inspection time of day (JT) is 0, the inspection at 16 o'clock on Sep. 22, 1991 is not yet performed. The inspection awaiting information also has the child inspection information, "BELT TENSION 2".

The inspection information on "BELT TENSION 2" indicates that its inspection item is the "BELT TENSION 2", its parent inspection information is the "BELT TENSION 1", and the "BELT TENSION 2" must be adjusted 10 hours of run after the adjustment of the "BELT TENSION 1". Further, it indicates that inspection awaiting begins at the next scheduled inspection time of day (ET) for the "BELT TENSION 1", i.e., 16 o'clock on Sep. 22, 1991, the next scheduled inspection time of day is 08 o'clock on Sep. 25, 1991, and since the resultant inspection time of day (JT) is 0, the inspection at 08 o'clock on Sep. 25, 1991 is not yet conducted. In addition, the child inspection information pointer 1 (CP1) and the child inspection information pointer 2 (CP2) both are 0, indicating that there is no child inspection information.

FIG. 8B provides an example of the inspection awaiting information memory table displayed on the CRT/MDI unit 7 according to an embodiment of the present invention.

In FIG. 8B, the inspection items are displayed at the right end and the inspection results and inspection schedules are indicated to its left. Upward arrows (↑) stand for the inspection results and downward (↓) arrows for the inspection schedules. Times of day following the arrows are resultant or scheduled times of day. In this example, oil level check, power supply inspection, slide cover cleaning, chuck lubrication and cooling fan cleaning were done at 08 o'clock 10 minutes on Sep. 19, 1991. The oil level check was made at 08 o'clock 10 minutes on Sep. 20, 1991. Further, the slide cover cleaning and chuck lubrication were conducted at 13 o'clock 10 minutes on Sep. 20, 1991.

At the bottom of the screen is displayed the current time of day, 19 o'clock 05 minutes on Sep. 20, 1991. It can be seen that the belt replacement scheduled for 16 o'clock 35 minutes on Sep. 20, 1991 was not made. The oil level check is scheduled for 08 o'clock 10 minutes on Sep. 21, 1991. The oil level check, slide cover cleaning and chuck lubrication are scheduled for 08 o'clock 10 minutes on Sep. 22, 1991. Further, the adjustment of belt tension 1 is scheduled for 16 o'clock 05 minutes on Sep. 22, 1991.

Figure 7B:
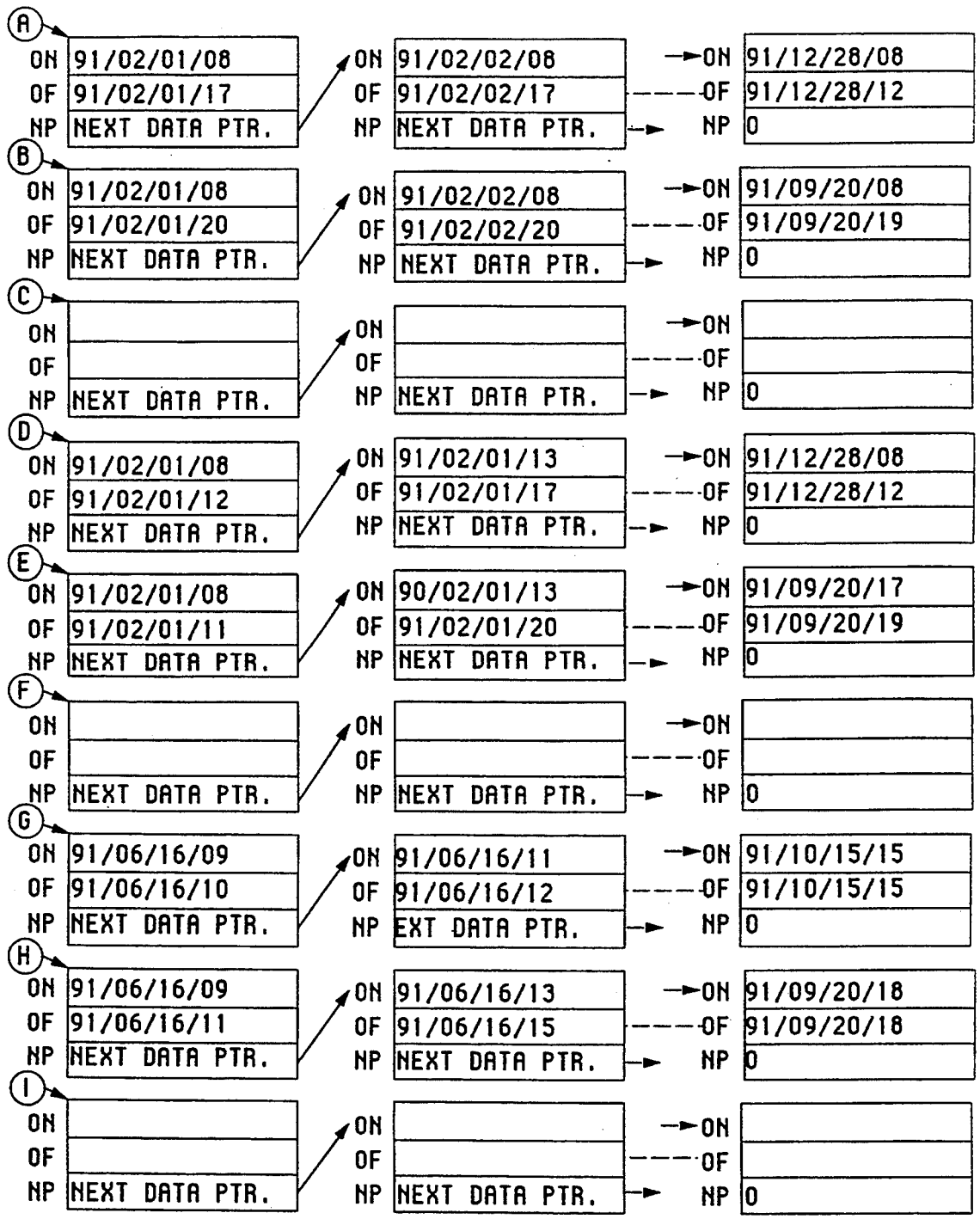

FIG. 7 shows structures of a run schedule memory and a run result memory according to the embodiment of the present invention. The run schedule memory and the run result memory contain data stored in the SRAM 2, and the run schedule memory data can be accessed for setting and deletion from the CRT/MDI unit 7.

A schedule pointer table has an array of pointers; a power-on schedule pointer, a power-on result pointer, a power-on vacancy pointer, a run schedule pointer, a run result pointer, a run vacancy pointer, a cutting schedule pointer, a cutting result pointer, and a cutting vacancy pointer.

The power-on schedule pointer indicates the beginning of power-on schedule data. The power-on schedule data consists of scheduled power-on time of day (ON), scheduled power-off time of day (OF) and a next data pointer (NP), and is linked with each other in a chain by the next data pointer (NP) on a time series basis. For example, the first power-on schedule data indicates that the power-on is scheduled for 08 o'clock on Feb. 01, 1991 and the power-off is scheduled for 17 o'clock on Feb. 01, 1991. Further the second power-on schedule data designated by the next data pointer (NP) indicates that the power-on is scheduled for 08 o'clock on Feb. 02, 1991 and the power-off is scheduled for 17 o'clock on Feb. 02, 1991. The power-on schedule data connected on a time series basis in this manner indicates the scheduled power-on and power-off times of day, and the final power-on schedule data indicates that the power-on is scheduled for 08 o'clock on Dec. 28, 1991 and the power-off is scheduled for 12 o'clock on Dec. 28, 1991, with its next data pointer (NP) being 0 to indicate that it is the final power-on schedule data.

The power-on result pointer indicates the beginning of power-on result data. The power-on result data consists of resultant power-on time of day (ON), resultant power-off time of day (OF) and the next data pointer (NP), and is linked with each other in a chain by the next data pointer (NP) on a time series basis. For example, the first power-on result data indicates that the power was switched on at 08 o'clock on Feb. 01, 1991 and the power switched off at 20 o'clock on Feb. 01, 1991. Further the second power-on result data designated by the next data pointer (NP) indicates that the power was switched on at 08 o'clock on Feb. 02, 1991 and the power switched off at 20 o'clock on Feb. 02, 1991. The power-on result data connected on a time series basis in this manner indicates the resultant power-on and power-off times of day, and the final power-on result data indicates that the power was switched on at 08 o'clock on Sep. 20, 1991 and the power was switched off or is still on at 19 o'clock on Sep. 20, 1991, with its next data pointer (NP) being 0 to indicate that it is the final power-on result data.

The power-on vacancy pointer indicates the beginning of power-on vacancy data. The power-on vacancy data is provided to ensure efficient registration and deletion of the power-on schedule data and the power-on result data, and is linked with each other in a chain by the next data pointer (NP).

The run schedule pointer indicates the beginning of run schedule data. The run schedule data consists of scheduled run start time of day (ON), scheduled run end time of day (OF) and the next data pointer (NP), and is lined with each other in a chain by the next data pointer (NP) on a time series basis. For example, the first run schedule data indicates that the run start is scheduled for 08 o'clock on Feb. 01, 1991 and the run end is scheduled for 12 o'clock on Feb. 01, 1991. Further the second run schedule data designated by the next data pointer (NP) indicates that the run start is scheduled for 13 o'clock on Feb. 01, 1991 and the run end is scheduled for 17 o'clock on Feb. 01, 1991. The run schedule data connected on a time series basis in this manner indicates the scheduled run start and run end times of day, and the final run schedule data indicates that the run start is scheduled for 08 o'clock on Dec. 28, 1991 and the run end is scheduled for 12 o'clock on Dec. 28, 1991, with its next data pointer (NP) being 0 to indicate that it is the final run schedule data.

The run result pointer indicates the beginning of run result data. The run result data consists of resultant run start time of day (ON), resultant run end time of day (OF) and the next data pointer (NP), and is linked with each other in a chain by the next data pointer (NP) on a time series basis. For example, the first run result data indicates that the run started at 08 o'clock on Feb. 01, 1991 and the run ended at 11 o'clock on Feb. 01, 1991. Further the second run result data designated by the next data pointer (NP) indicates that the run started at 13 o'clock on Feb. 01, 1991 and the run ended at 20 o'clock on Feb. 01, 1991. The run result data connected on a time series basis in this manner indicates the resultant run start and run end times of day, and the final run result data indicates that the run started at 17 o'clock on Sep. 20, 1991 and the run ended or is still being made at 19 o'clock on Sep. 20, 1991, with its next data pointer (NP) being 0 to indicate that it is the final run result data.

The run vacancy pointer indicates the beginning of run vacancy data. The run vacancy data is provide to ensure efficient registration and deletion of the run schedule data and the run result data, and is linked with each other in a chain by the next data pointer (NP).

The cutting schedule pointer indicates the beginning of cutting schedule data. The cutting schedule data consists of scheduled cutting start time of day (ON), scheduled cutting end time of day (OF) and the next data pointer (NP), and is linked with each other in a chain by the next data pointer (NP) on a time series basis. For example, the first cutting schedule data indicates that the cutting start is scheduled for 09 o'clock on Jun. 16, 1991 and the cutting end is scheduled for 10 o'clock on Jun. 16, 1991. Further the second cutting schedule data designated by the next data pointer (NP) indicates that the cutting start is scheduled for 11 o'clock on Jun. 16, 1991 and the cutting end is scheduled for 12 o'clock on Jun. 16, 1991. The cutting schedule data connected on a time series basis in this manner indicates the scheduled cutting start and cutting end times of day, and the final cutting schedule data indicates that the cutting start is scheduled for 15 o'clock on Oct. 15, 1991 and the cutting end is scheduled for 16 o'clock on Oct. 15, 1991, with its next data pointer (NP) being 0 to indicate that it is the final cutting schedule data.

The cutting result pointer indicates the beginning of cutting data result. The cutting result data consists of resultant cutting start time of day (ON), resultant cutting end time of day (OF) and the next data pointer (NP), and is linked with each other in a chain by the next data pointer (NP) on a time series basis. For example, the first cutting result data indicates that the cutting started at 09 o'clock on Jun. 16, 1991, and the cutting ended at 11 o'clock on Jun. 16, 1991. Further the second cutting result data designated by the next data pointer (NP) indicates that the cutting started at 13 o'clock on Jun. 16, 1991 and the cutting ended at 15 o'clock on Jun. 16, 1991. The cutting result data connected on a time series basis in this manner indicates the resultant cutting start and cutting end times of day, and the final cutting result data indicates that the cutting started at 18 o'clock on Sep. 20, 1991 and the cutting ended or is still being made at 19 o'clock on Sep. 20, 1991, with its next data pointer (NP) being 0 to indicate that it is the final cutting result data.

The cutting vacancy pointer indicates the beginning of cutting vacancy data. The cutting vacancy data is provided to ensure efficient registration and deletion of the cutting schedule data and the cutting result data, and is linked with each other in a chain by the next data pointer (NP).

FIG. 8A gives an example of the run schedule memory and the run result memory displayed on the CRT/MDI unit 7 according to the embodiment of the present invention.

In FIG. 8A, items are displayed at the left end and run schedules and run results are displayed to their right in a band graph format. The schedules are represented by a white band and the results by a hatched band. For example, since the power-on schedule is from 8 o'clock to 17 o'clock, it is indicated by the white band from 8 to 5. It can be seen from the power-on result indicated by the hatched band from 8 to 7 that the power was not switched off from 8 o'clock to the current time of day.

The processing will now be described with reference to FIGS. 9A-9C, which illustrate a processing sequence of updating the run result memory according to an embodiment of the present invention.

Figure 9A:
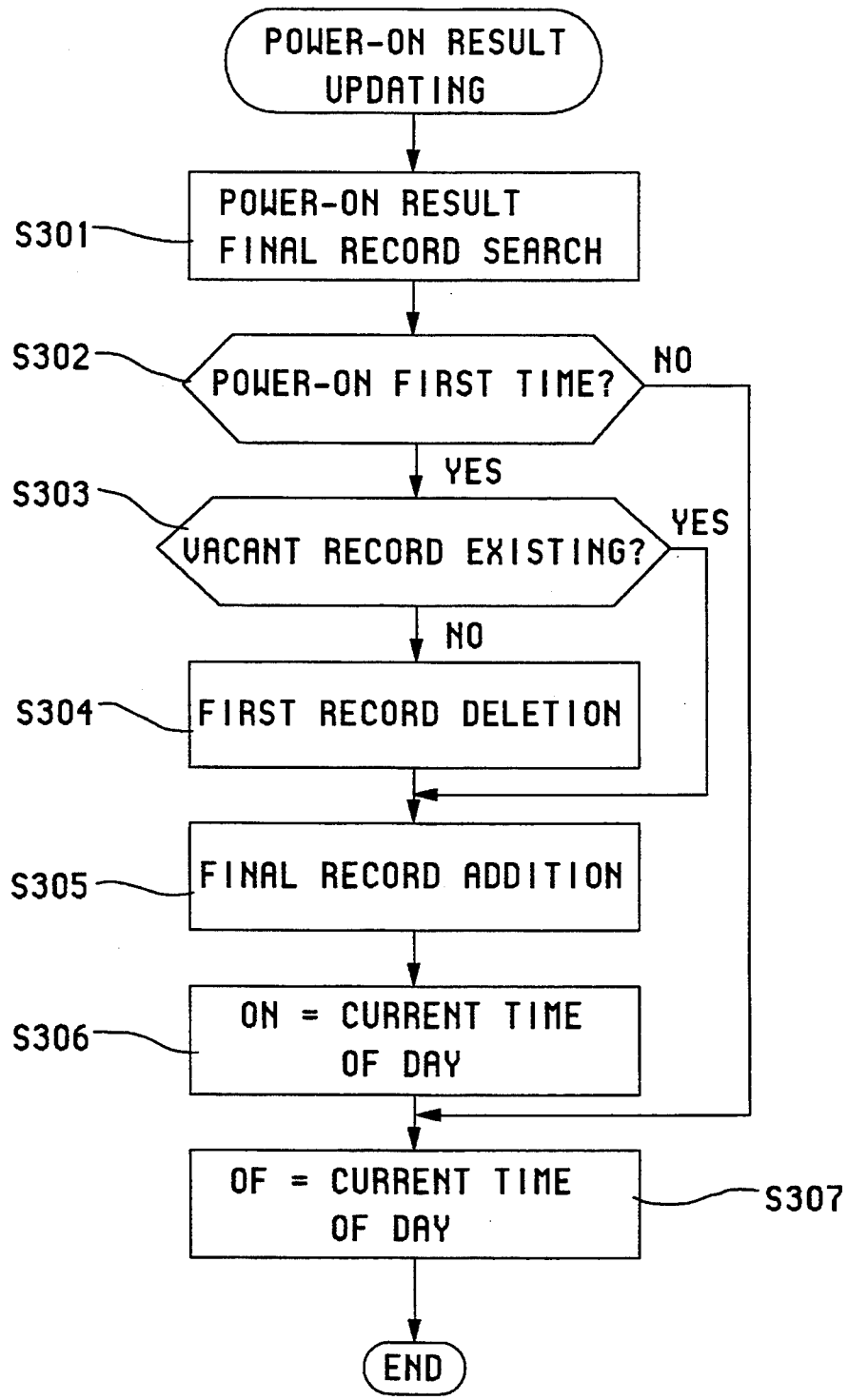
FIGS. 9A, 9B and 9C are processing flowcharts for updating the run result memory according to an embodiment of the present invention.
Figure 9B:
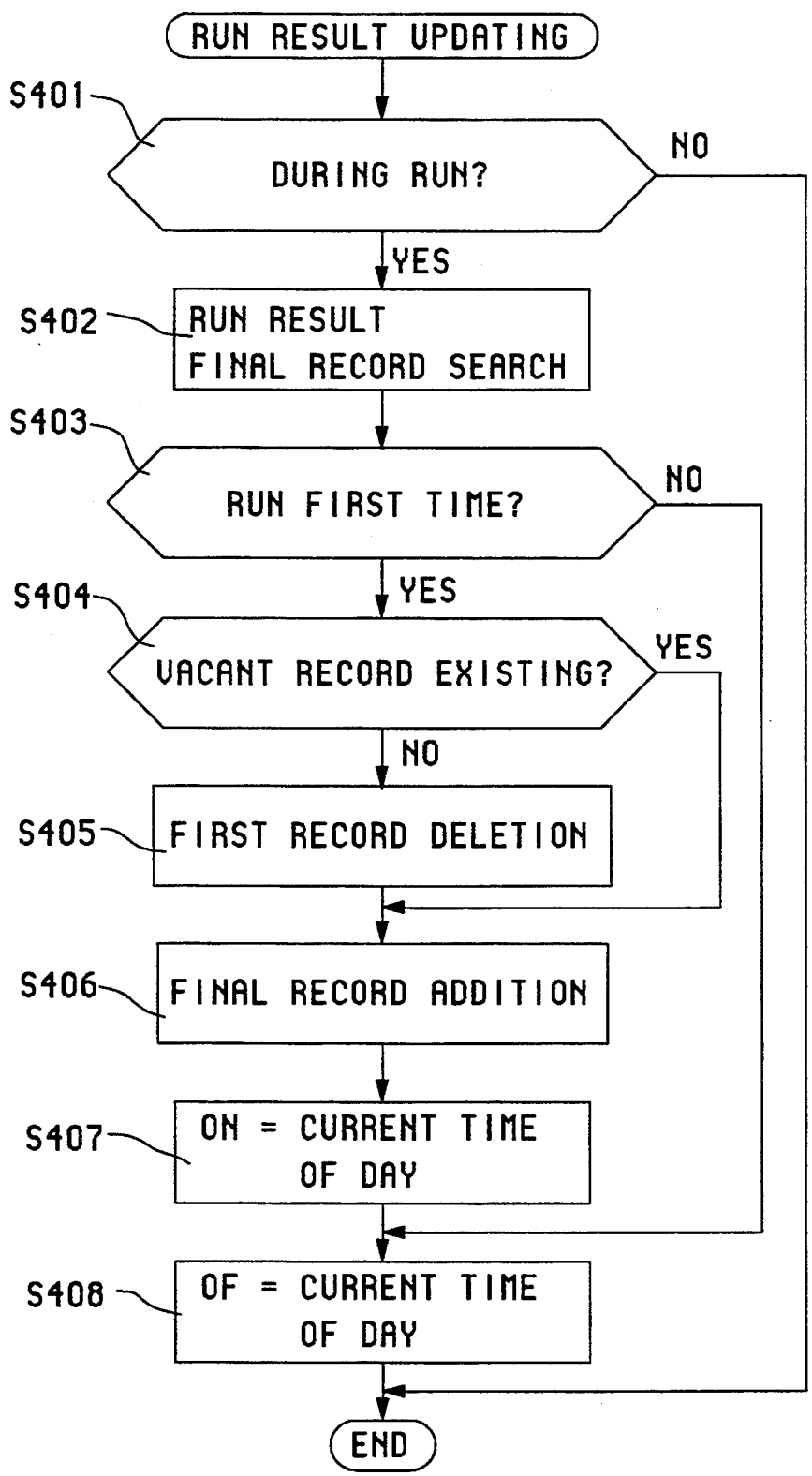
Figure 9C:
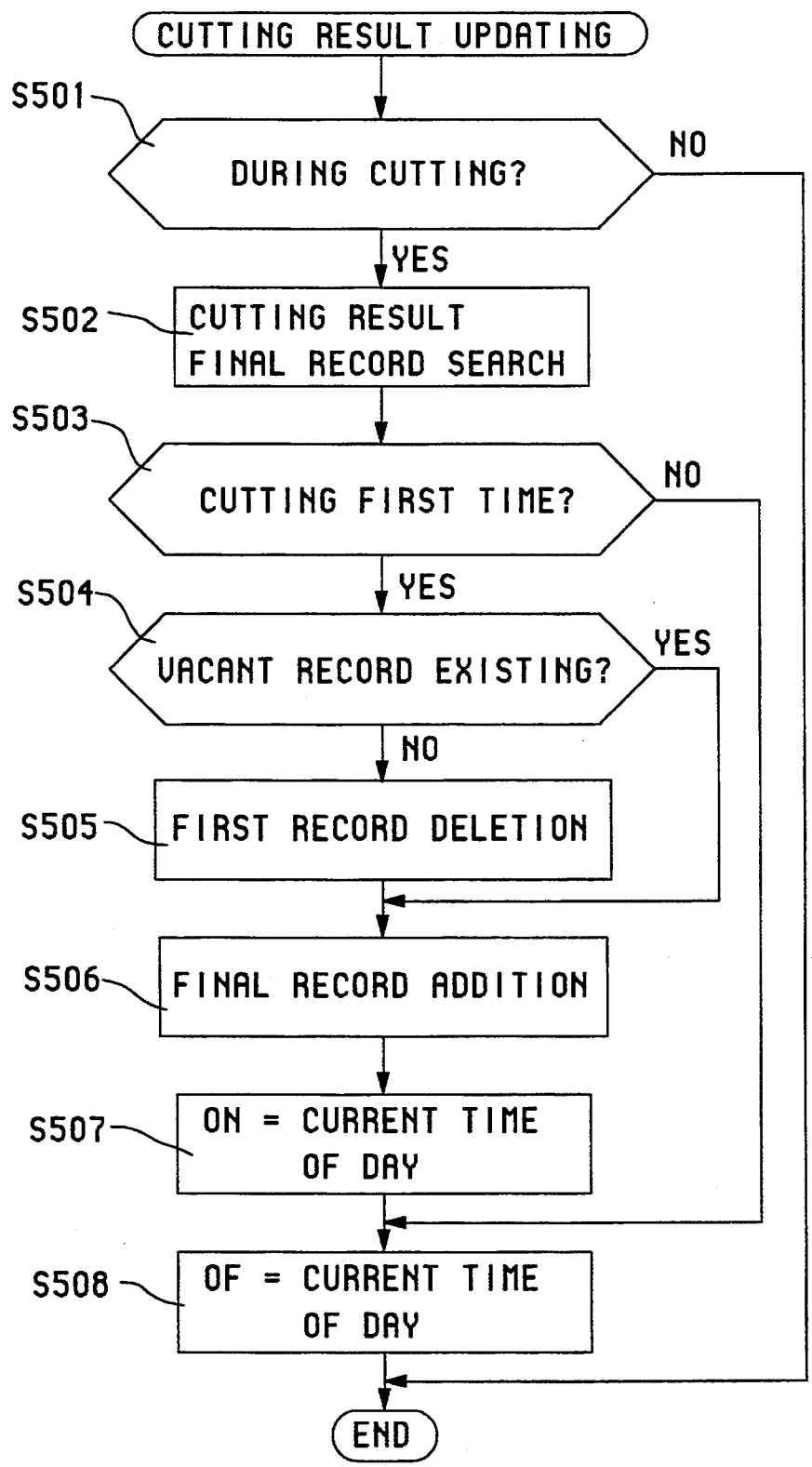

FIG. 9A shows the processing of updating the power-on result data, FIG. 9B the processing of updating the run result data, and FIG. 9C the processing of the cutting result data.

Each processing is started cyclically.

The operation of FIG. 9A will now be described.

Step 301: The power-on result data is traced, beginning at the power-on result pointer (PJP), to search for the final power-on result data, which is the power-on result data having the next data pointer (NP) of 0.

Step 302: Whether or not the power-on result data updating processing is the first one after power-on is checked. Since, the power-on result data updating processing is started cyclically, it is judged as the first one after power-on when a difference between the current time of day and the resultant power-off time of day (OF) of the final power-on result data is two or more times greater than the start cycle of the power-on result data updating processing.

If it is not the first one after power-on, the processing branches to step 307.

Step 303: If the power-on result data updating processing is the first one after power-on, the power-on result data is added at the end of the final power-on result data and the added data should be employed as the final power-on result data.

Since one piece of power-on vacancy data is required for this purpose, whether there is power-on vacancy data or not is checked.

The power-on vacancy data exists if the next data pointer (NP) of the first power-on vacancy data designated by the power-on vacancy pointer (PKP) is not 0.

When there is the power-on vacancy data, the processing jumps to step 305.

Step 304: When the power-on vacancy data does not exist, the first power-on result data is deleted to create the power-on vacancy data.

To delete the power-on result data, the next data pointer (NP) of the first power-on result data is written to the power-on result pointer (PJP).

Then, the power-on vacancy pointer (PKP) is written to the next data pointer (NP) of the power-on result data deleted.

Finally, the power-on result pointer (PJP), which has not yet been rewritten, is written to the power-on vacancy pointer (PKP).

Step 305: One piece of power-on vacancy data is fetched and connected at the end of the power-on result data.

To fetch the power-on vacancy data, the next data pointer (NP) of the first power-on vacancy data is written to the power-on vacancy pointer (PKP).

To add the power-on result data, 0 is written to the next data pointer (NP) of the power-on vacancy data fetched, and the power-on vacancy pointer (PKP), which has not yet been rewritten, is written to the next data pointer (NP) of the final power-on result data.

Step 306: The current time of day is read and written to the resultant power-on time of day (ON) of the added final power-on result data.

Step 307: The current time of day is read and written to the resultant power-off time of day (OF) of the final power-on result data, and the processing is terminated.

The operation of FIG. 9B will now be described.

Step 401: Whether a run is being made or not is checked. If the run is not being made, the processing is terminated.

Step 402: The run result data is traced, beginning at the run result pointer (UJP), to search for the final run result data, which is the run result data having the next data pointer (NP) of 0.

Step 403: Whether or not the run result data updating processing is the first one after run start is checked. Since the run result data updating processing is started cyclically, it is judged as the first one after run start when a difference between the current time of day and the resultant run end time of day (OF) of the final run result data is two or more times greater than the start cycle of the run result data updating processing.

If it is not the first one after run start, the processing branches to step 408.

Step 404: If the run result data updating processing is the first one after run start, the run result data is added at the end of the final run result data and the added data should be employed as the final run result data.

Since one piece of run vacancy data is required for this purpose, whether there is run vacancy data or not is checked.

The run vacancy data exists if the next data pointer (NP) of the first run vacancy data designated by the run vacancy pointer (UKP) is not 0.

When there is the run vacancy data, the processing jumps to step 406.

Step 405: When the run vacancy data does not exist, the first run result data is deleted to create the run vacancy data.

To delete the run result data, the next data pointer (NP) of the first run result data is written to the run result pointer (UJP).

Then, the run vacancy pointer (UKP) is written to the next data pointer (NP) of the run result data deleted.

Finally, the run result pointer (UJP), which has not yet been rewritten, is written to the run vacancy pointer (UKP).

Step 406: One piece of run vacancy data is fetched and connected at the end of the run result data.

To fetch the run vacancy data, the next data pointer (NP) of the first run vacancy data is written to the run vacancy pointer (UKP).

To add the run result data, 0 is written to the next data pointer (NP) of the run vacancy data fetched, and the run vacancy pointer (UKP), which has not yet been rewritten, is written to the next data pointer (NP) of the final run result data.

Step 407: The current time of day is read and written to the resultant run start time of day (ON) of the final run result data added.

Step 408: The current time of day is read and written to the resultant run end time of day (OF) of the final run result data, and the processing is terminated.

The operation of FIG. 9C will now be described.

Step 501: Whether cutting is being performed or not is checked. If the cutting is not being carried out, the processing terminated.

Step 502: The cutting result data is traced, beginning at the cutting result pointer (CJP), to search for the final cutting result data, which is the cutting result data having the next data pointer (NP) of 0.

Step 503: Whether or not the cutting result data updating processing is the first one after cutting start is checked. Since the cutting result data updating processing is started cyclically, it is judged as the first one after cutting start when a difference between the current time of day and the resultant cutting end time of day (OF) of the final cutting result data is two or more times greater than the start cycle of the cutting result data updating processing.

If it is not the first one after cutting start, the processing branches to step 508.

Step 504: If the cutting result data updating processing is the first one after cutting start, the cutting result data is added at the end of the final cutting result data and the added data should be employed as the final cutting result data.

Since one piece of cutting vacancy data is required for this purpose, whether there is cutting vacancy data or not is checked.

The cutting vacancy data exists if the next data pointer (NP) of the first cutting vacancy data designated by the cutting vacancy pointer (CKP) is not 0.

When there is the cutting vacancy data, the processing jumps to step 506.

Step 505: When the cutting vacancy data does not exist, the first cutting result data is deleted to create the cutting vacancy data.

To delete the cutting result data, the next data pointer (NP) of the first cutting result data is written to the cutting result pointer (CJP).

Then, the cutting vacancy pointer (CKP) is written to the next data pointer (NP) of the cutting result data deleted.

Finally, the cutting result pointer (CJP), which has not yet been rewritten, is written to the cutting vacancy pointer (CKP).

Step 506: One piece of cutting vacancy data is fetched and connected at the end of the cutting result data.

To fetch the cutting vacancy data, the next data pointer (NP) of the first cutting vacancy data is written to the cutting vacancy pointer (CKP).

To add the cutting result data, 0 is written to the next data pointer (NP) of the cutting vacancy data fetched, and the cutting vacancy pointer (CKP), which has not yet been rewritten, is written to the next data pointer (NP) of the final cutting result data.

Step 507: The current time of day is read and written to the resultant cutting start time of day (ON) of the final cutting result data added.

Step 508: The current time of day is read and written to the resultant cutting end time of day (OF) of the final cutting result data, and the processing is terminated.

Figure 10A:
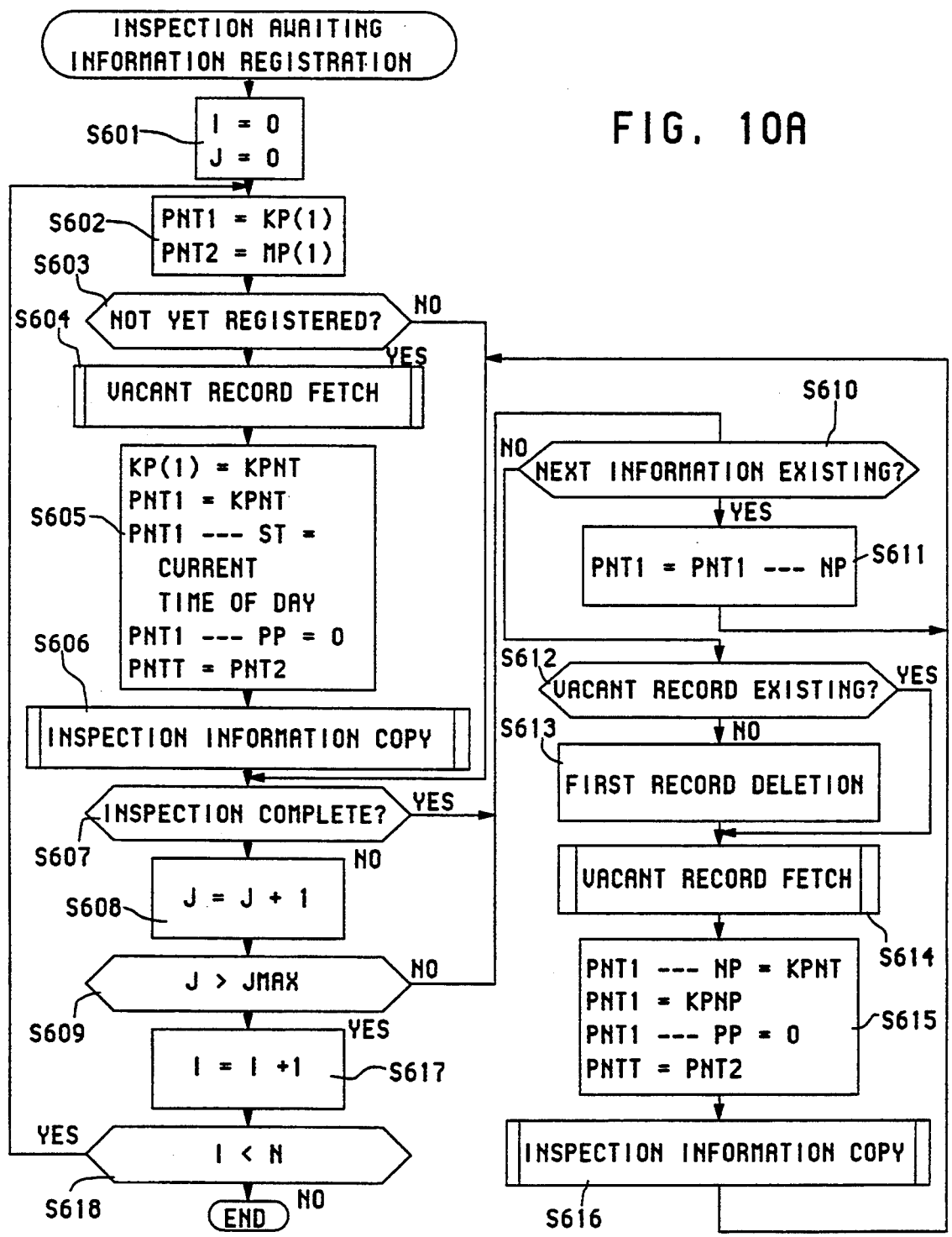
FIGS. 10A and 10B are processing flowcharts for registering inspection awaiting information to the inspection awaiting information memory table according to an embodiment of the present invention.
Figure 10B:
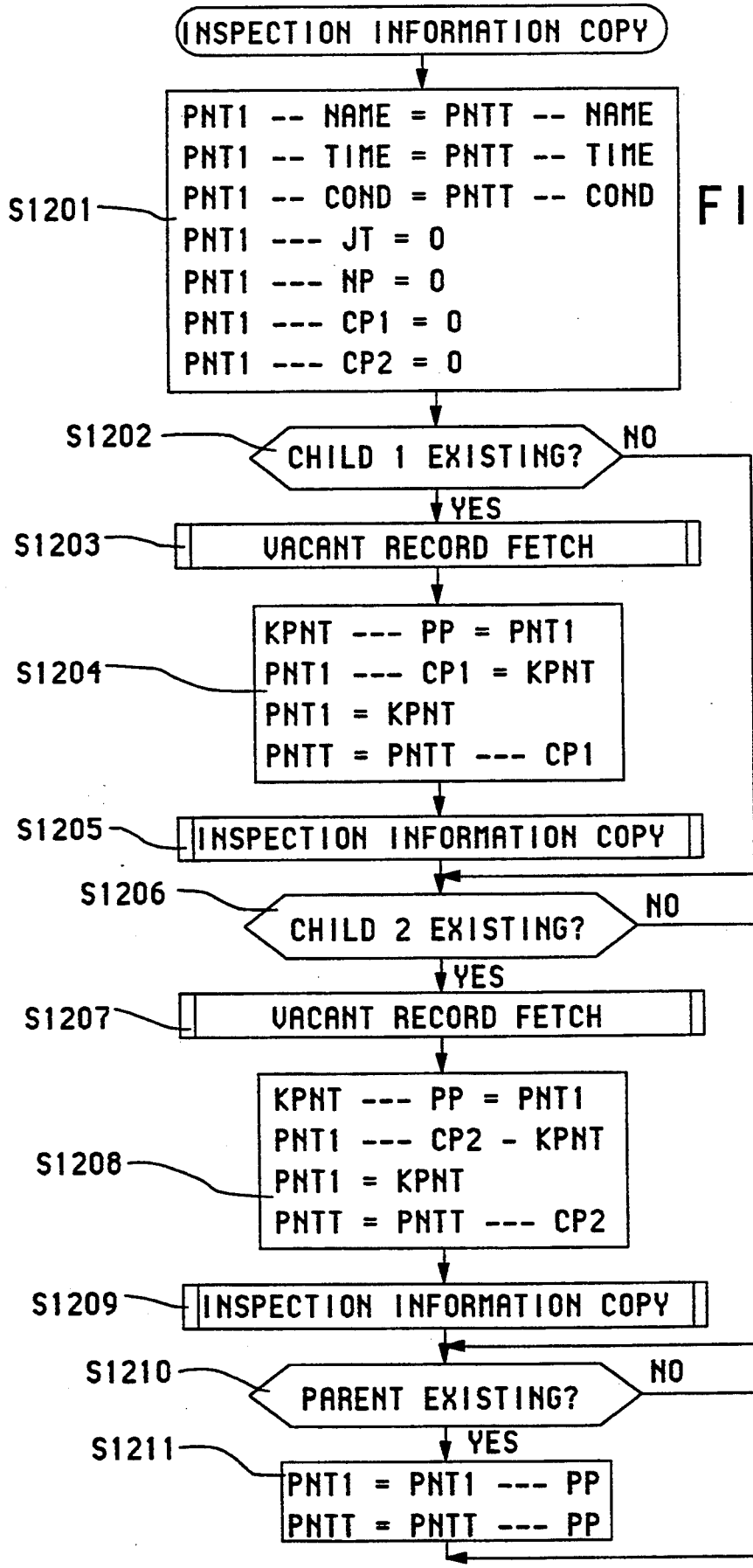

FIGS. 10A and 10B comprise processing flowcharts for registering the inspection awaiting information to the inspection awaiting information memory table according to the embodiment of the present invention.

FIG. 10A shows main inspection awaiting information registration processing which is started at power-on, when the execution of a certain inspection item is complete, or when the inspection information memory table is modified.

FIG. 10B shows a subroutine called by the inspection awaiting information registration processing in FIG. 10A for copying the inspection information to the inspection awaiting information memory table. In addition, this subroutine has a recursive call structure to call itself as a subroutine, allowing the copy processing of the inspection awaiting information memory table in a hierarchical structure to be performed by repeating a recursive call.

The operation of FIG. 10A will now be described.

Step 601: An initial value of 0 is set to an array counter (I) for counting the arrays in the master pointer table and current pointer table.

An initial value of 0 is set to an uninspected item counter (J) for cutting the number of uninspected inspection items.

Step 602: The Ith current pointer (KP(I)) is set to a temporary inspection awaiting information pointer (PNT1). The Ith master pointer (MP(I)) is set to a temporary inspection awaiting information pointer (PNT2).

Step 603: Whether or not one or more pieces of inspection awaiting information have been registered is checked as to one piece of inspection information. When new inspection information is added to the inspection information memory table, an unregistered state takes place.

If the temporary inspection awaiting information pointer (PNT1) is 0, the inspection awaiting information is not yet registered. If it is not unregistered, the processing branches to step 607.

Step 604: If the inspection awaiting information is not yet registered, new inspection awaiting information is registered. For this purpose, vacant inspection awaiting information is first fetched. At this time, the address of the vacant inspection awaiting information fetched is set to a vacant inspection awaiting information pointer (KPNT).

Step 605: The vacant inspection awaiting information fetched is registered to the current pointer table. First the vacant inspection awaiting information pointer (KPNT) is set to the Ith current pointer (KP(I)) and the temporary inspection awaiting information pointer (PNT1), and is registered to the current pointer table.

Then, the current time of day is read and set to the inspection awaiting start time of day (PNT1-ST) of the inspection awaiting information registered. Since this is the first inspection awaiting information, 0 is set to the parent inspection awaiting information pointer (PNT1-PP) of the inspection awaiting information registered.

To call the inspection information copy processing subroutine, the temporary inspection information pointer (PNT2) is copied to the current temporary inspection information pointer (PNTT).

Step 606: The inspection information copy processing subroutine is called. The first inspection information and all the succeeding inspection information in the hierarchy are registered to the inspection awaiting information memory table.

Step 607: Whether the first inspection awaiting information is the result information of which inspection is complete. Unless the resultant inspection time of day (PNT1-JT) of the inspection awaiting information is 0, the inspection is complete.

It should be noted that the inspection of the inspection awaiting information just registered at the steps 604 to 606 is not yet complete.

When the inspection is complete, the processing jumps to step 610.

Step 608: If the inspection is not complete, the uninspected item counter (J) counts up.

Step 609: If the uninspected item counter (J) is less than or equal to a maximum uninspected inspection awaiting information registration value (Jmax), the processing branches to step 610.

The maximum uninspected inspection awaiting information registration value (Jmax) is a maximum inspection schedule value which can be registered. If Jmax is 1, the past inspection result information and up to the next inspection schedule information are registered. If Jmax is 2, the past inspection result information and up to the second next inspection schedule information are registered.

The maximum uninspected inspection awaiting information registration value (Jmax) is the information stored into the SRAM (2) and can be accessed for setting and deletion from the CRT/MDI unit (7).

Step 610: Whether the next inspection awaiting information has already been registered or not is checked.

The next inspection awaiting information has already been registered unless the next inspection awaiting information pointer (PNT1-NP) of the inspection awaiting information is 0.

If the next inspection awaiting information has already been registered, the temporary inspection awaiting information pointer (PNT1) is updated to the next inspection awaiting information pointer (PNT1-NP) of the inspection awaiting information at step 611, and the processing returns to be step 607 and the above operation is repeated.

Step 612: If the next inspection awaiting information has not yet been registered, the next inspection awaiting information is added. For this purpose, the vacant inspection awaiting information is fetched. If the vacant inspection awaiting information does not exist at this time, the oldest past inspection result information is deleted for use as the vacant inspection awaiting information. Therefore, whether the vacant inspection awaiting information exists or not is first checked.

The vacant inspection awaiting information exists unless the next inspection awaiting information pointer (KP(N)-NP) of the first vacant inspection awaiting information table is 0.

When there is the vacant inspection awaiting information, the processing branches to step 614.

Step 613: If the vacant inspection awaiting information does not exist, the oldest past inspection result information is deleted for use as the vacant inspection awaiting information. First the next inspection awaiting information pointer (KP(I)-NP) of the first inspection awaiting information table is set to the current pointer (KP(I)), thereby deleting the oldest past inspection result information. Then the deleted inspection awaiting information table and the succeeding inspection awaiting information tables in the hierarchy are connected to the vacant inspection awaiting information table.

Step 614: The vacant inspection awaiting information is fetched. At this time, the address of the vacant inspection awaiting information fetched is set to the vacant inspection awaiting information pointer (KPNT).

Step 615: The vacant inspection awaiting information fetched is connected to the inspection awaiting information. First, the vacant inspection awaiting information pointer (KPNT) is set to the next inspection awaiting information pointer (PNT1-NP) of the inspection awaiting information and the temporary inspection awaiting information pointer (PNT1), and is connected to the inspection awaiting information.

Then, since this is the first inspection awaiting information, 0 is set to the parent inspection awaiting information pointer (PNT1-PP) of the inspection awaiting information registered.

To call the inspection information copy processing subroutine, the temporary inspection information pointer (PNT2) is copied to the current temporary inspection information pointer (PNTT).

Step 616: The inspection information copy processing subroutine is called. The first inspection information and all the succeeding inspection information in the hierarchy are registered to the inspection awaiting information memory table.

The processing returns to the step 607 and the above operation is repeated.

As described above, the processing of the steps 607 through 616 is repeated, and when the uninspected item counter (J) counts up and exceeds the maximum uninspected inspection awaiting information registration value (Jmax), the processing progresses to step 617 according to the judgement at the step 609.

Step 617: The array counter (I) counts up and the processing advances to the registration of the inspection awaiting information of the next inspection item.

Step 618: If the array counter (I) is less than the maximum number of inspection information (N), the processing branches to the step 602 and the above described processing is repeated.

When the inspection awaiting information registration is repeated in this manner, the registration processing of all inspection information is soon complete, the array counter (I) is judged as not less than the maximum number of inspection information (N) at the step 618, and the processing is terminated.

The operation of FIG. 10B will now be described.

Step 1201: The pointer (PNTT) of the inspection information table as a copy source and the pointer (PNT1) of the inspection awaiting information table as a copy destination are provided.

The inspection item (NAME), the inspection interval (TIME) and the inspection interval condition (COND) of the copy source are copied to the copy destination.

Since the copy destination is new inspection awaiting information, the resultant inspection time of day (JT), the next inspection awaiting information pointer (NP), the child inspection awaiting information pointer 1 (CP1) and the child inspection awaiting information pointer 2 (CP2) are cleared to 0.

Step 1202: Whether the child inspection information 1 exists or not is checked. The child inspection information 1 exists unless the child inspection information pointer 1 (PNTT-CP1) of the copy source is 0.

If the child inspection information 1 does not exist, the processing branches to step 1206.

Step 1203: If the child inspection information 1 exists, the vacant inspection awaiting information table is fetched and the child inspection information 1 is copied. First, the vacant inspection awaiting information is fetched. At this time, the address of the vacant inspection awaiting information fetched is set to the vacant inspection awaiting information pointer (KPNT).

Step 1204: The vacant inspection awaiting information fetched is connected to the inspection awaiting information as the child inspection awaiting information 1. First, the inspection awaiting information table pointer (PNT1) is copied to the parent inspection awaiting information pointer (KPNT-PP) of the vacant inspection awaiting information. Then, the vacant inspection awaiting information pointer (KPNT) is set to the child inspection awaiting information pointer 1 (PNT1-CP1) of the inspection awaiting information and the inspection awaiting information pointer (PNT1), and is connected to the inspection awaiting information.

To call the inspection information copy processing subroutine, the child inspection information pointer 1 (PNTT-CP1) of the inspection information is copied to the inspection information pointer (PNTT).

Step 1205: The inspection information copy processing subroutine (itself) is called. The specified inspection information and all the succeeding inspection information in the hierarchy are registered to the inspection awaiting information memory table.

Step 1206: Whether the child inspection information 2 exists or not is checked. The child inspection information 2 exists unless the child inspection information pointer 2 (PNTT-CP2) of the copy source is 0.

If the child inspection information 2 does not exist, the processing branches to step 1210.

Step 1207: If the child inspection information 2 exists, the vacant inspection awaiting information table is fetched and the child inspection information 2 is copied. First, the vacant inspection awaiting information is fetched. At this time, the address of the vacant inspection awaiting information fetched is set to the vacant inspection awaiting information pointer (KPNT).

Step 1208: The vacant inspection awaiting information fetched is connected to the inspection awaiting information as the child inspection awaiting information 1. First, the inspection awaiting information table pointer (PNT1) is copied to the parent inspection awaiting information pointer (KPNT-PP) of the vacant inspection awaiting information. Then, the vacant inspection awaiting information pointer (KPNT) is set to the child inspection awaiting information pointer 2 (PNT1-CP2) of the inspection awaiting information and the inspection awaiting information pointer (PNT1), and is connected to the inspection awaiting information.

To call the inspection information copy processing subroutine, the child inspection information pointer 2 (PNTT-CP2) of the inspection information is copied to the inspection information pointer (PNTT).

Step 1209: The inspection information copy processing subroutine (itself) is called. The specified inspection information and all the succeeding inspection information in the hierarchy are registered to the inspection awaiting information memory table.

Step 1210: To make this processing a recursive call structure, if the subroutine has been recursive called, the inspection information table pointer (PNTT) and the inspection awaiting information table pointer (PNT1) must be restored to the status they has before the subroutine was called.

The parent inspection awaiting information exists when the subroutine has been recursive called. When there is the parent inspection awaiting information, the parent inspection awaiting information pointer (PNT1-PP) of the inspection awaiting information table is not 0.

If the subroutine has not been recursive called, the operation returns to the processing called.

Step 1211: When the subroutine has been recursive called, the parent inspection awaiting information table pointer (PNT1-PP) of the inspection awaiting information is set to the inspection awaiting information table pointer (PNT1) and the parent inspection information table pointer (PNTT-PP) of the inspection information set to the inspection information table pointer (PNTT), whereby the inspection information table pointer (PNT1) and the inspection awaiting information table pointer (PNT1) are restored to the status they had before the subroutine was called.

Ultimately, the operation returns to the processing called.

FIGS. 11A, 11B, 12A, 12B and 12C are processing flowcharts for updating the next scheduled inspection time of day (ET), the inspection awaiting start time of day (ST) and the resultant inspection time of day of the inspection awaiting information memory table and outputting the inspection pre-announcement message and the inspection time of day arrival message according to the embodiment of the present invention.

Figure 11A:
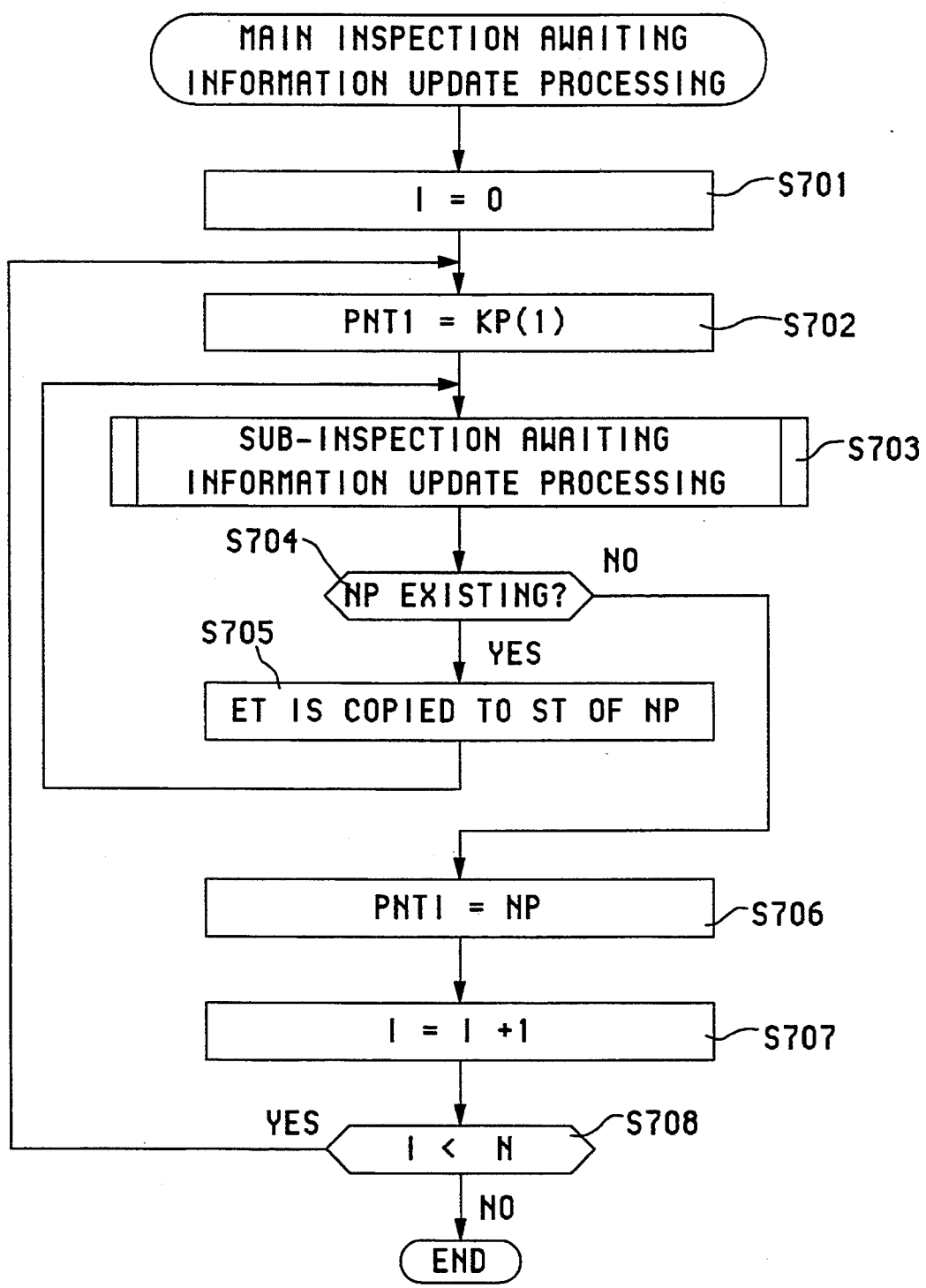
FIGS. 11A, 11B, 12A, 12B and 12C are processing flowcharts for updating next scheduled inspection time of day (ET), inspection awaiting start time of day (ST) and resultant inspection time of day of the inspection awaiting information memory table and outputting the inspection pre-announcement message and the inspection time of day arrival message according to an embodiment of the present invention.

FIG. 11A illustrates main inspection awaiting information updating processing for performing said processing, which is started cyclically.

Figure 11B:
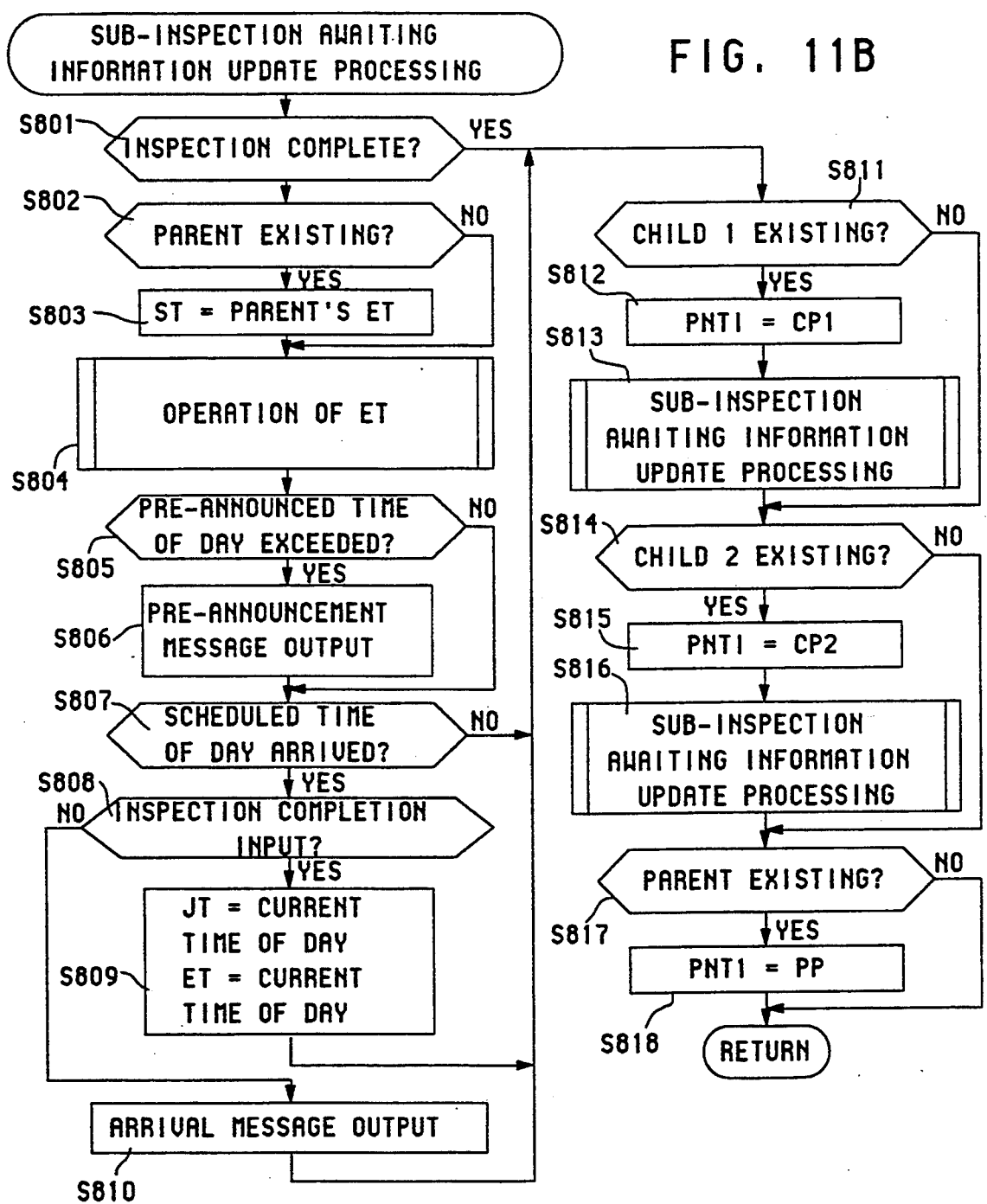

FIG. 11B shows a subroutine called from the main inspection awaiting information updating processing (FIG. 11A), which updates the first inspection awaiting information and all the succeeding inspection awaiting information in the hierarchy. In addition, this subroutine has a recursive call structure to call itself as a subroutine, allowing the update processing of the inspection awaiting information memory table in a hierarchical structure to be performed by repeating a recursive call.

Figure 12A:
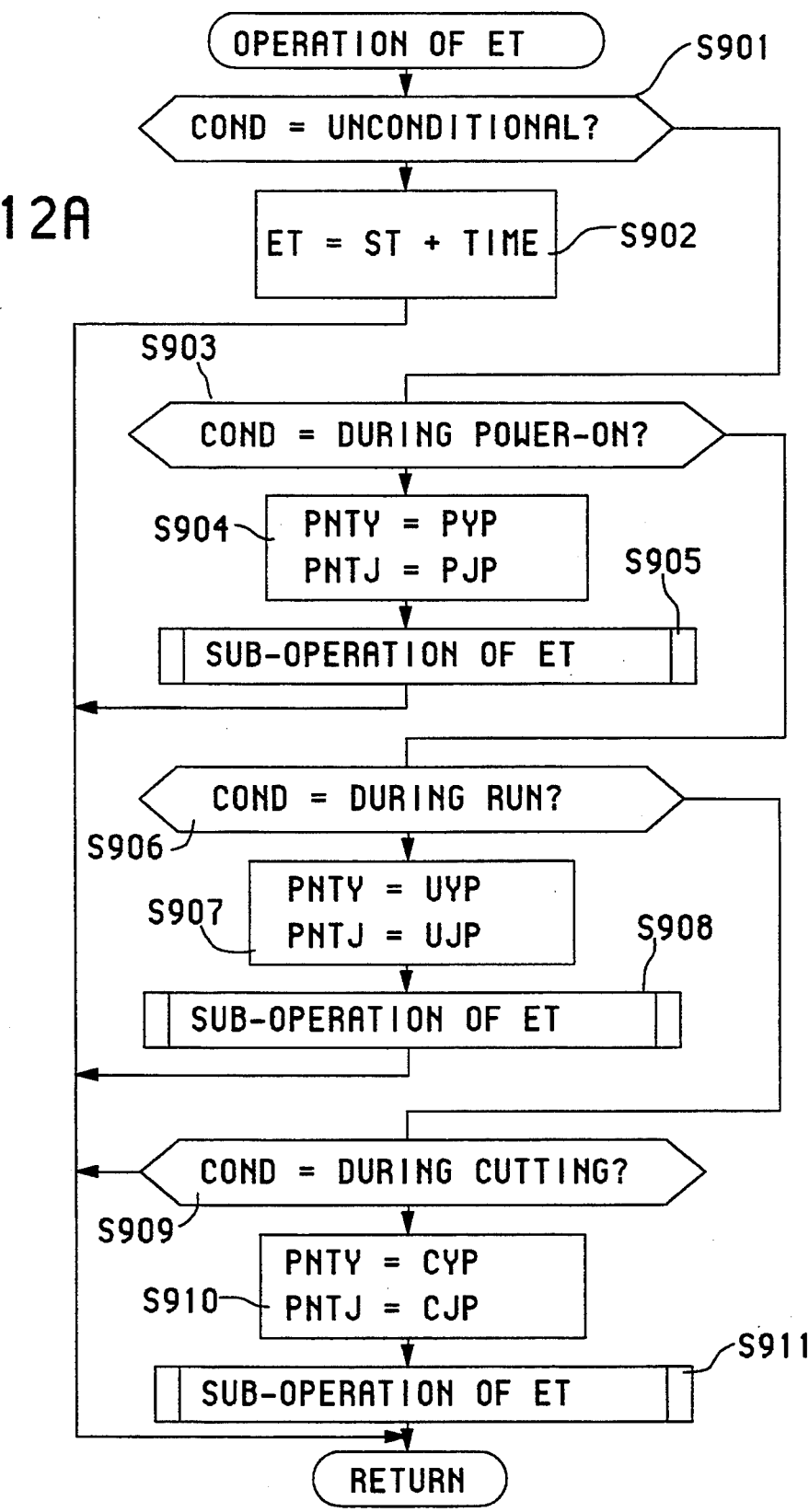

FIG. 12A illustrates a subroutine called from the sub inspection awaiting information updating processing (FIG. 11B), which operates on the next scheduled inspection time of day (ET) of a certain inspection awaiting information memory table.

Figure 12B:
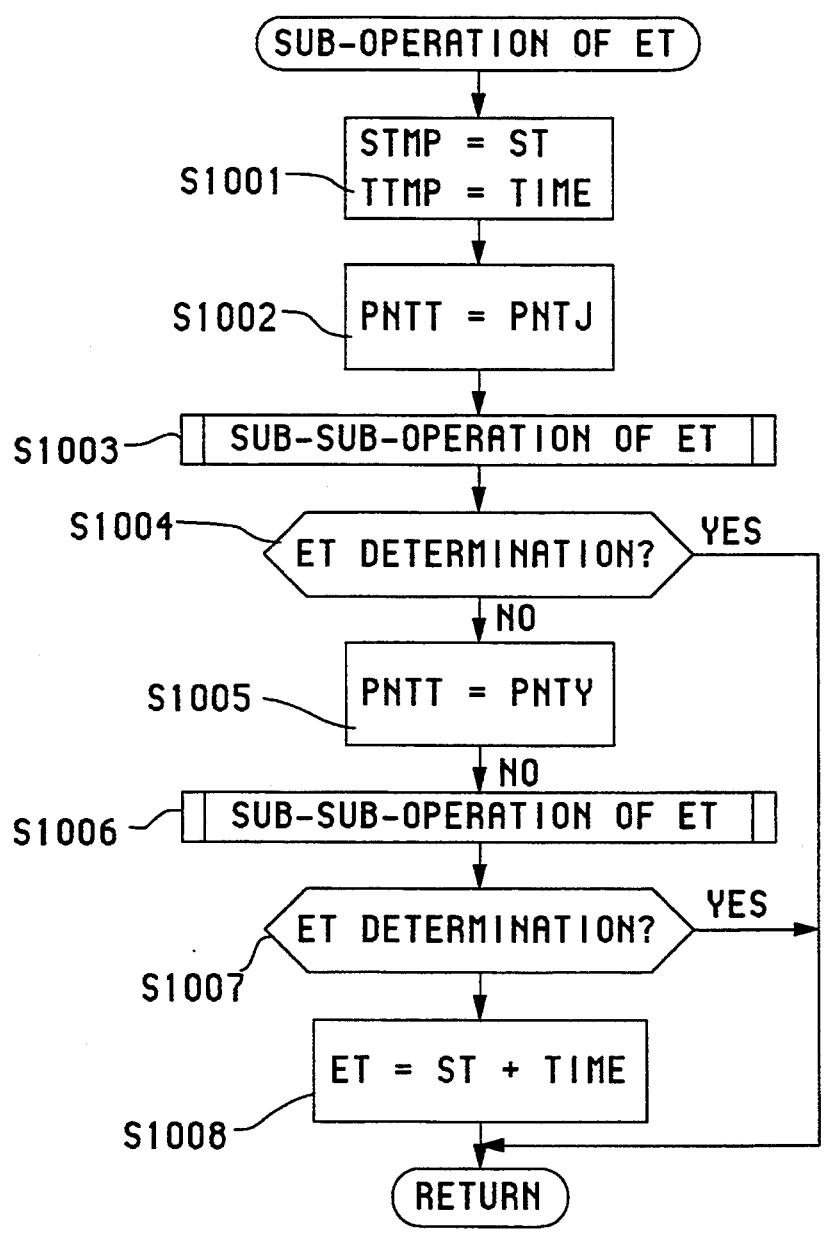

FIG. 12B shows a subroutine called from the ET operation processing (FIG. 12A), which operates on the ET while tracing the run result memory table and the run schedule memory table.

Figure 12C:
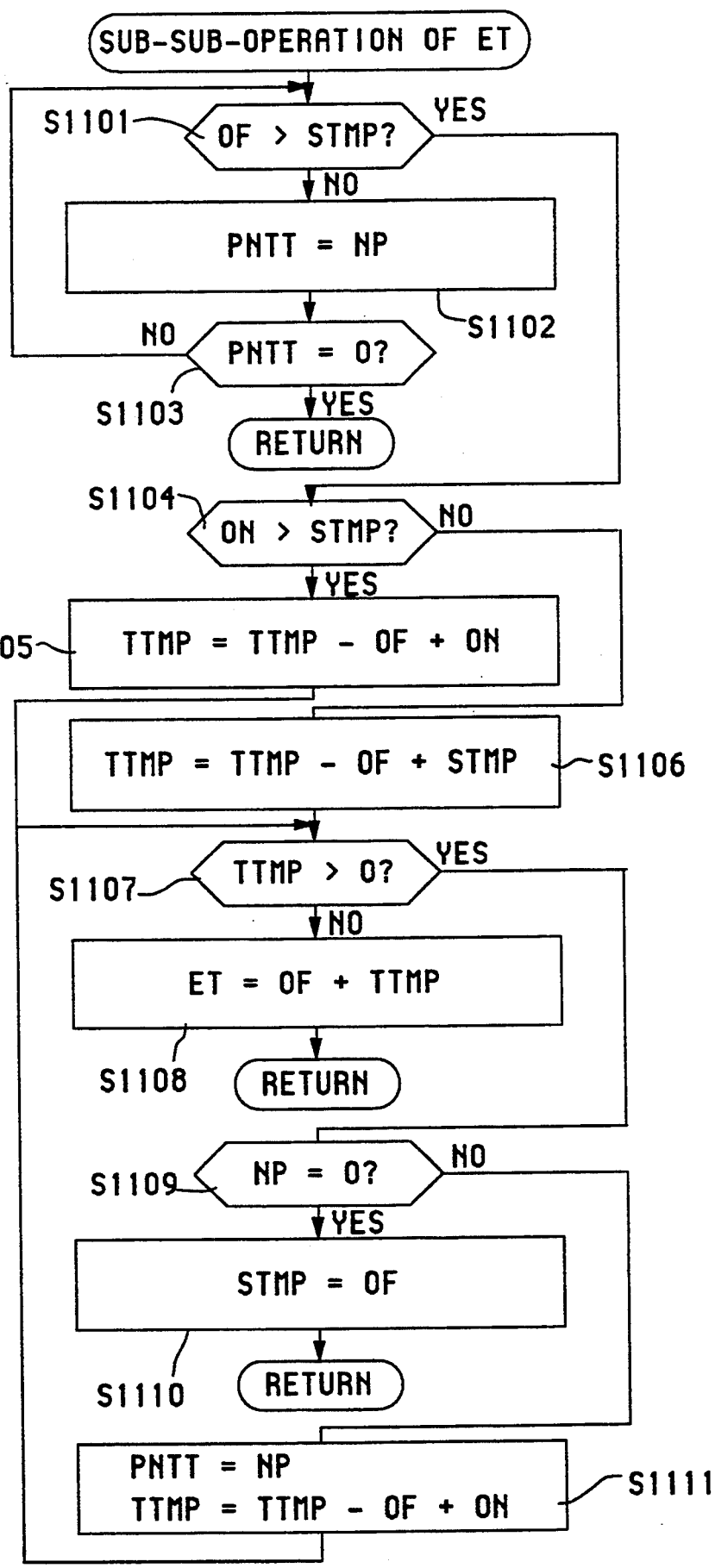
Figure 14A:
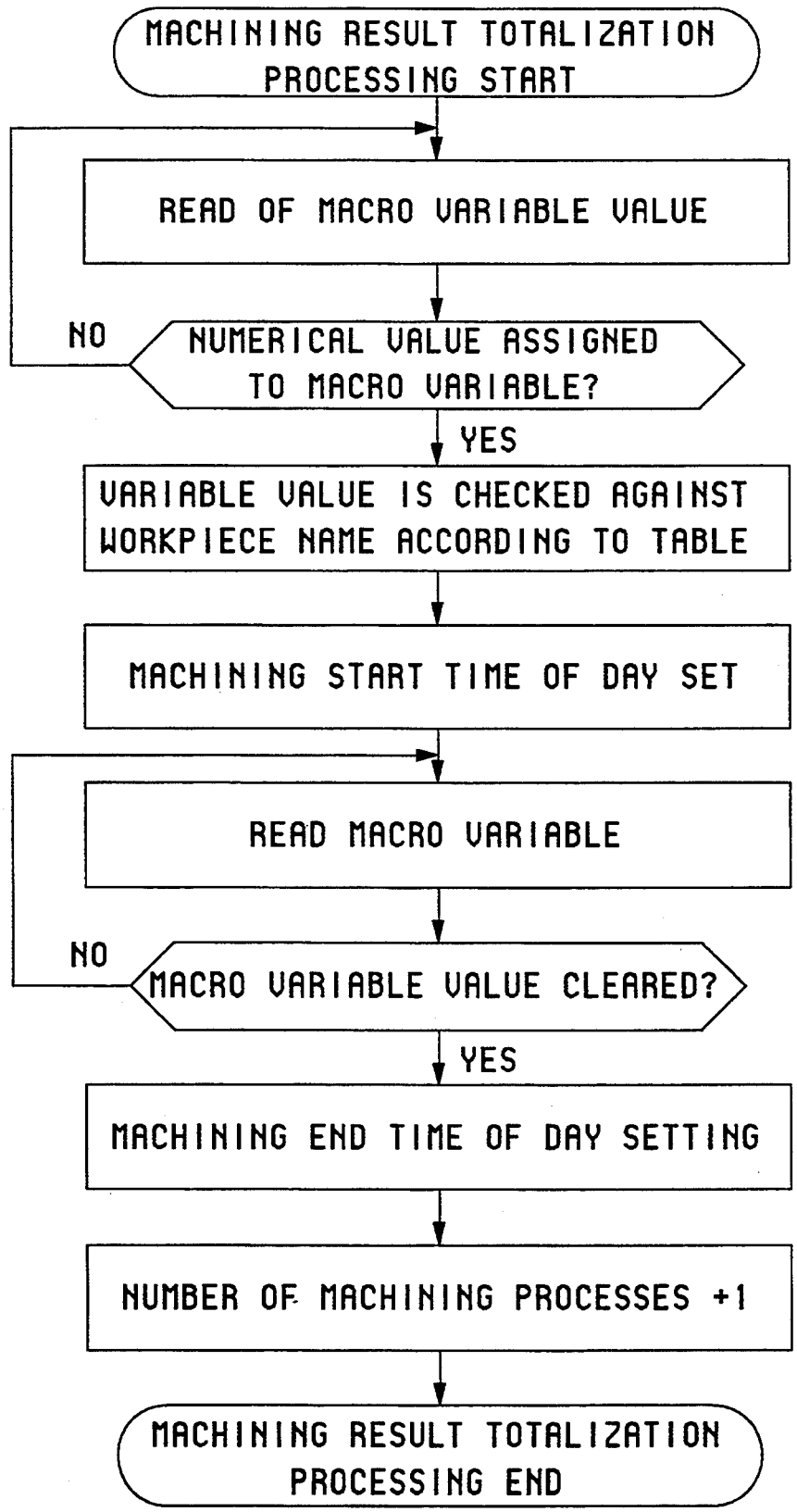
FIG. 14A illustrates a flowchart and FIG. 14B a machining result totalization table showing an example of a prior art machining result totalizer for an NC machine tool, as disclosed in Japanese Patent Publication No. 312043 of 1988.
Figure 15A:
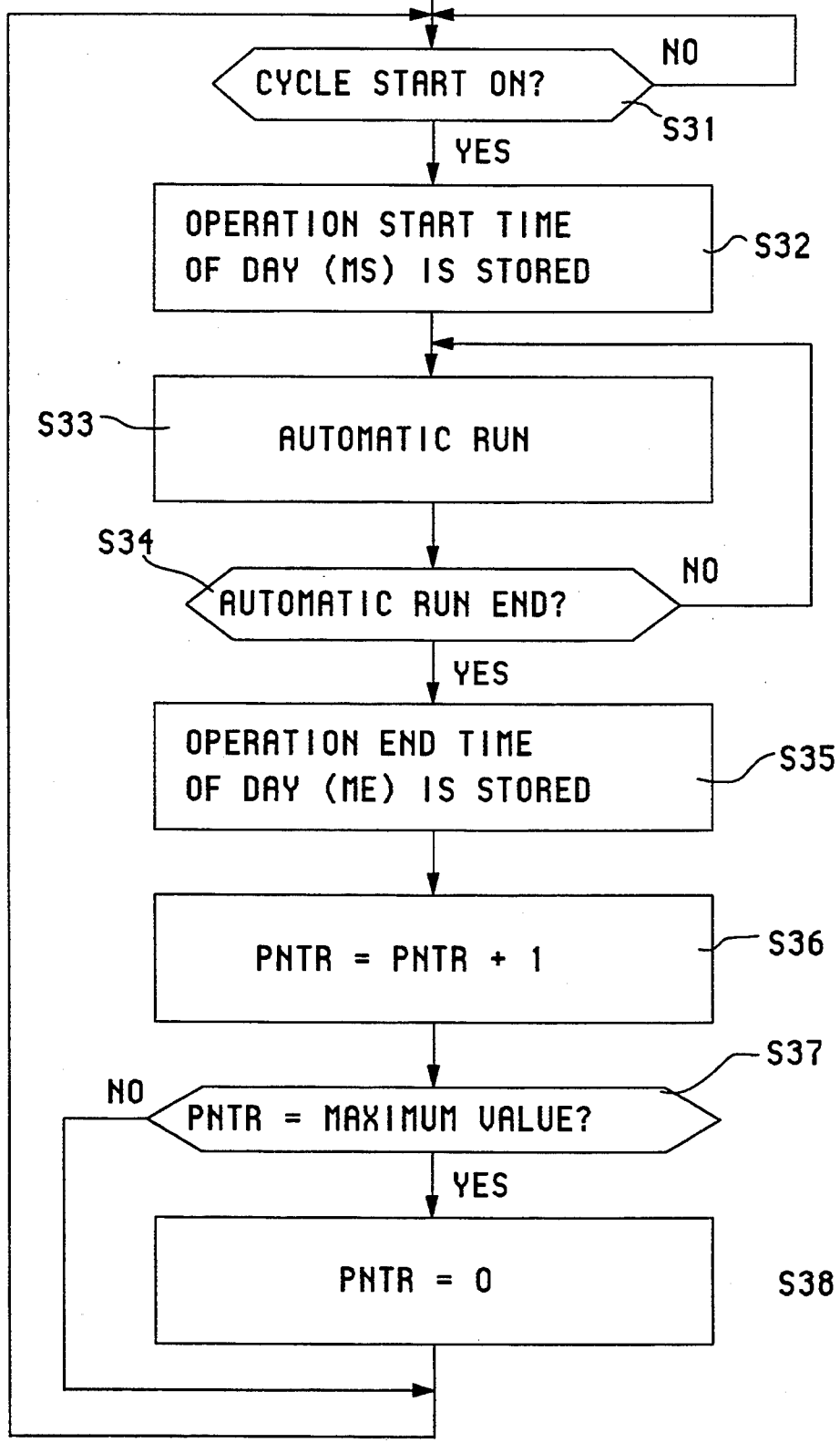
FIG. 15A illustrates a flowchart of a conventional operation time display system embodiment and FIG. 15B a structure of stored operation time of day, as disclosed in Japanese Patent Publication No. 312044 of 1988.
Figure 16A:
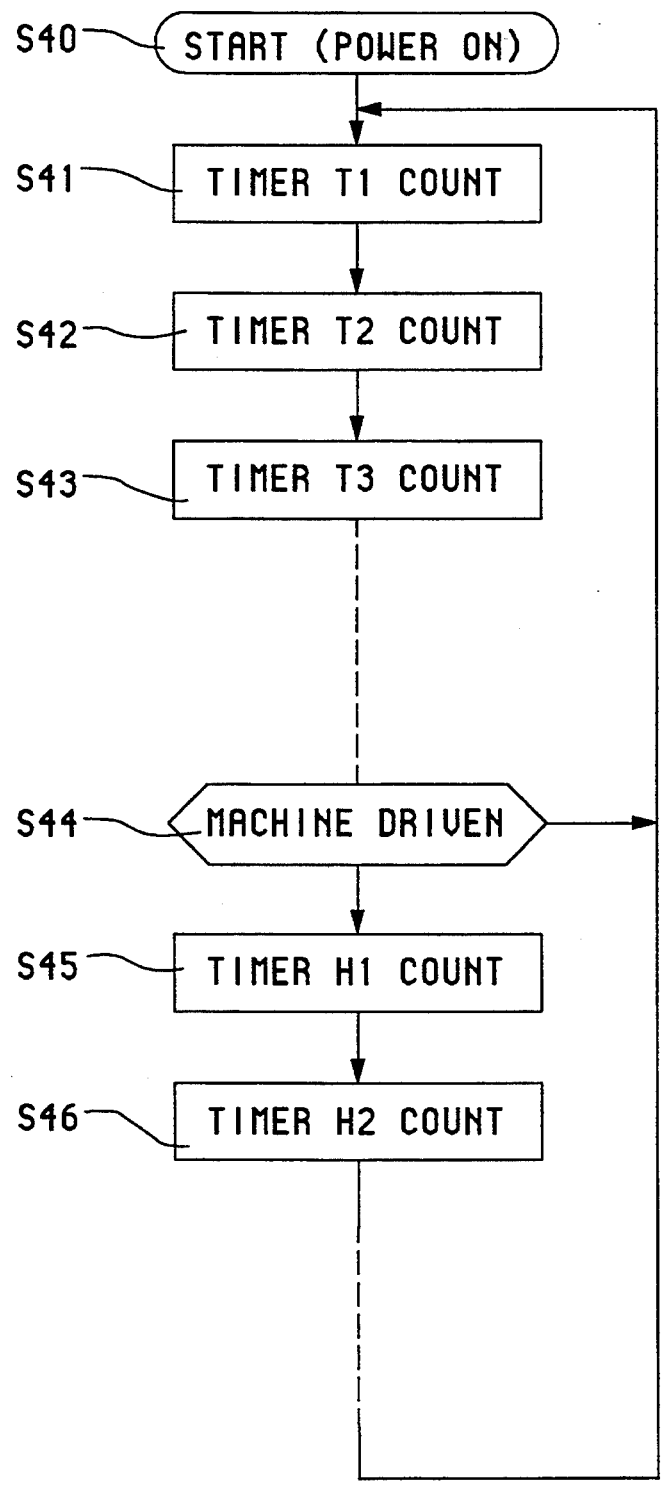
FIGS. 16A and 16B comprise processing flowcharts for a conventional numerical control unit embodiment equipped with maintenance time warning means, as disclosed in Japanese Patent Publication No. 62441 of 1985.
Figure 16B:
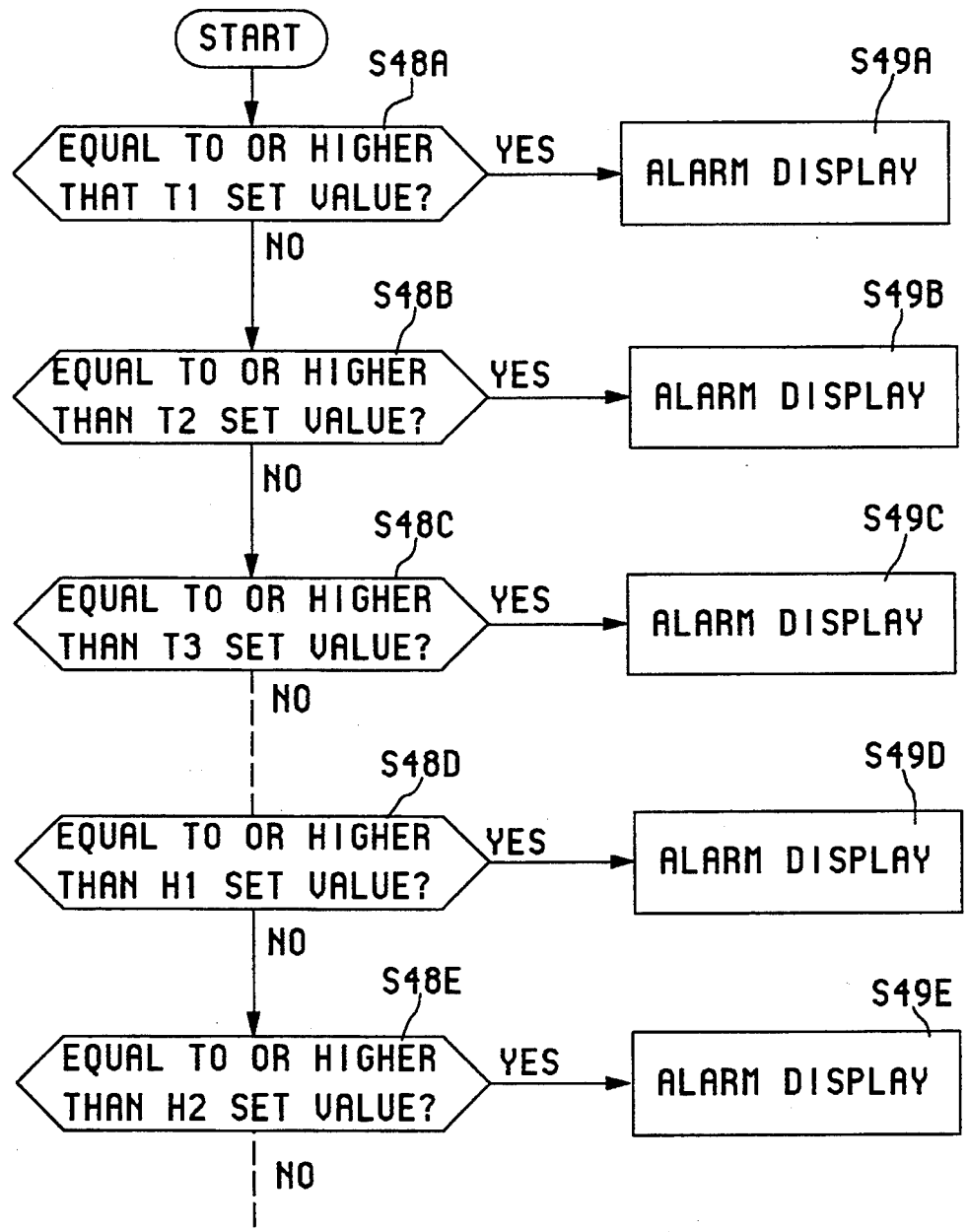
Figure 17A:
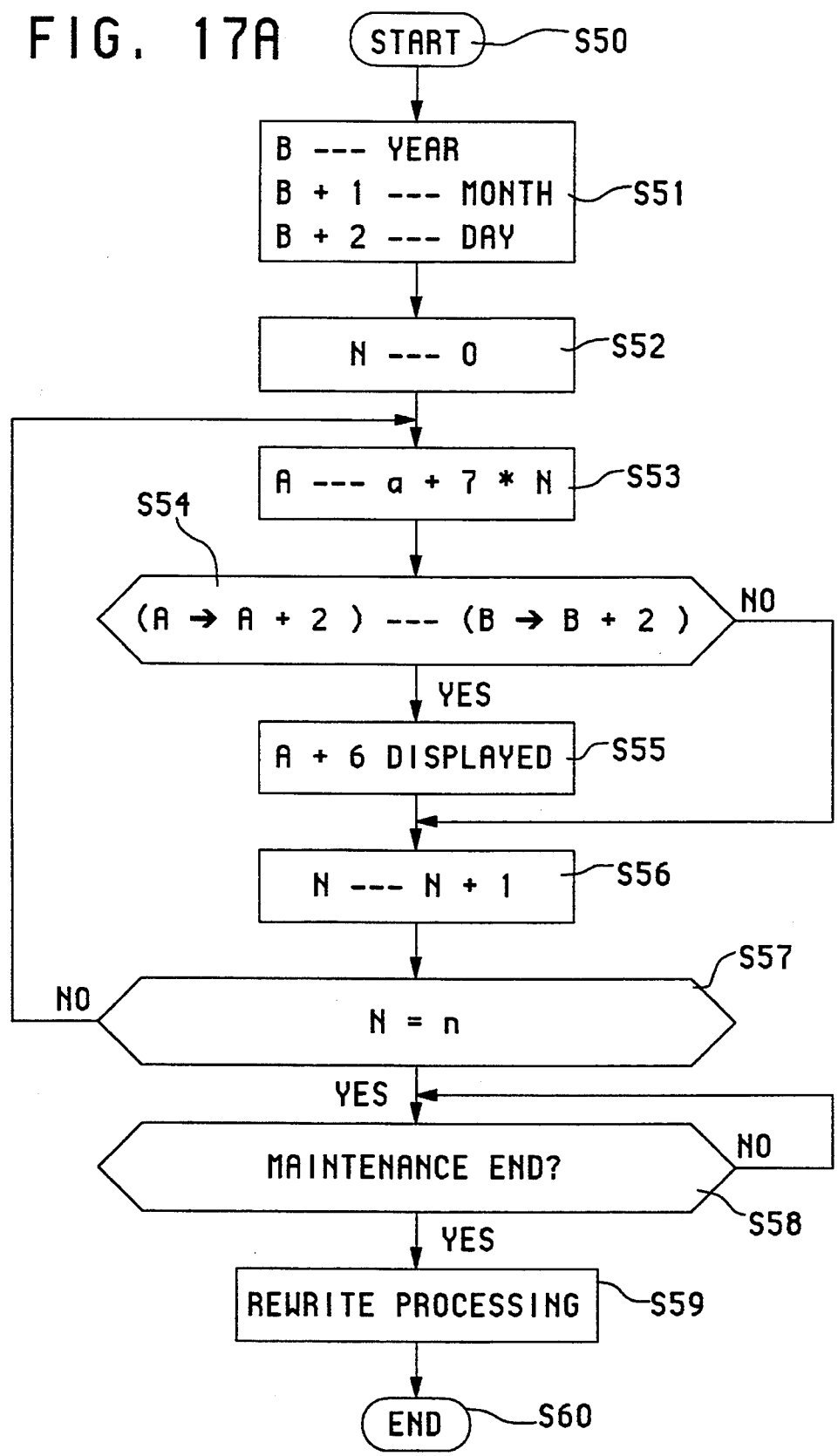
FIG. 17A shows a flowchart illustrating part of the processing of a conventional numerical control unit equipped with a periodic maintenance message displaying function and FIG. 17B illustrates a memory map showing the memory contents thereof, as disclosed in Japanese Patent Publication No. 241805 of 1986.
Figure 17B:
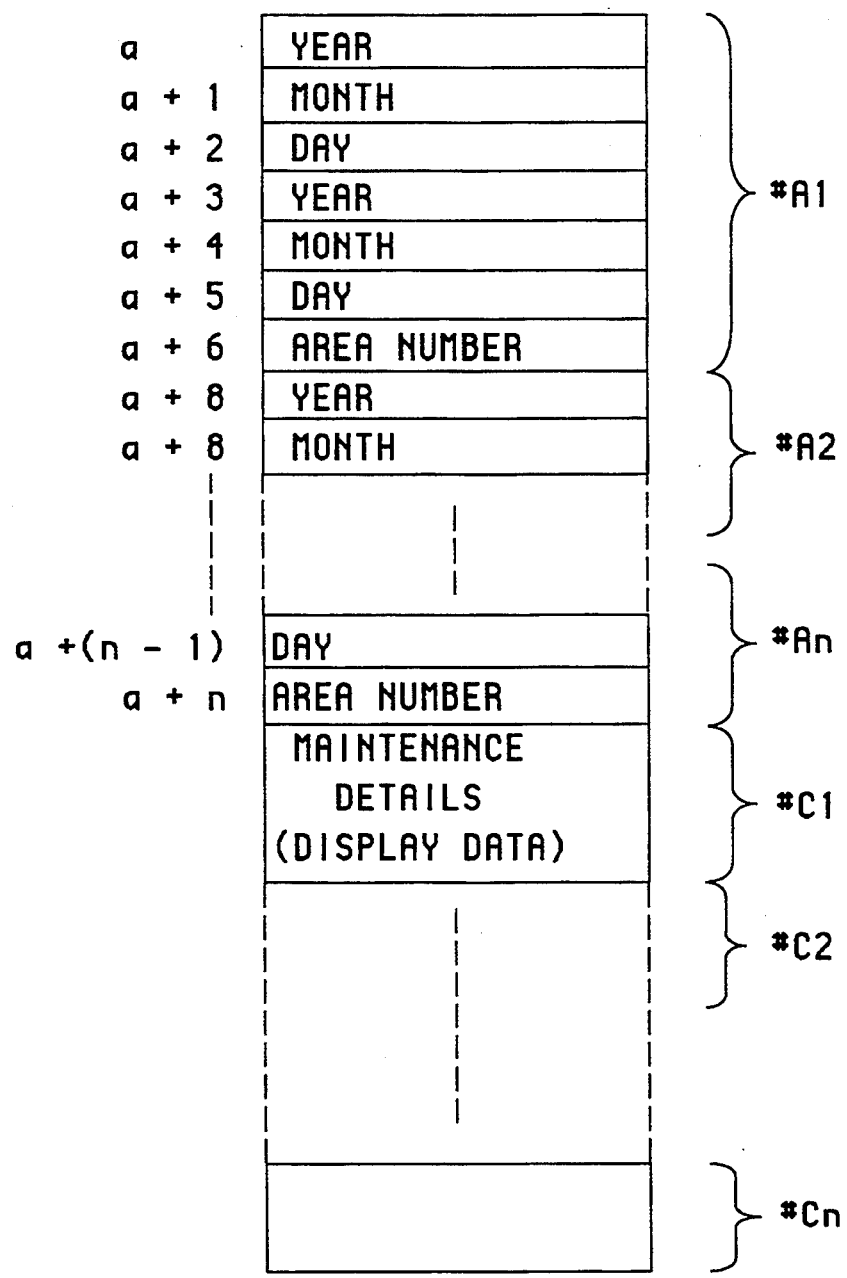

FIG. 12C shows a subroutine called from the sub ET operation processing (FIG. 12B), which operates on the ET while tracing either of the run result memory table and the run schedule memory table specified.

The operation in FIG. 11A will now be described.

Step 701: An initial value of 0 is set to an array counter (I) for counting the arrays of the current pointers in the inspection awaiting information memory table.

Step 702: The Ith current pointer (KP(I)) is set to a temporary current pointer (PNT1).

Step 703: The sub inspection awaiting information updating processing is called, thereby updating the inspection awaiting information designated by the temporary current pointer (PNT1) and the succeeding inspection awaiting information down to the bottom layer connected as the child inspection awaiting information thereof.

Step 704: Whether the next inspection awaiting information exists or not is checked.

The next inspection awaiting information exists unless the next inspection awaiting information pointer (PNT1-NP) of the inspection awaiting information designated by the temporary current pointer is 0.

If the next inspection awaiting information does not exist, the processing branches to step 707.

Step 705: When the next inspection awaiting information exists, the next scheduled inspection time of day (PNT1-ET) of the inspection awaiting information is copied to the inspection awaiting start time of day (PNT1-NP-ET) of the next inspection awaiting information whereby the second next scheduled inspection time of day is referenced from the next scheduled inspection time of day.

Step 706: The next inspection awaiting information pointer (PNT1-NP) of the inspection awaiting information designated by the temporary current pointer is set to the temporary current pointer (PNT1), and the processing returns to the step 703, wherein the next information awaiting information is updated.

This is repeated until the inspection awaiting information updating of one inspection item is complete. Then there is no next inspection awaiting information, the judgement that no next inspection awaiting information exists is made at the step 704, and the processing jumps to step 707.

Step 707: The array counter (I) is advanced by 1 to prepare for the inspection awaiting information updating of the next inspection item.

Step 708: Whether the inspection awaiting information updating of all inspection items is finished.

If the array counter (I) is equal to or greater than the maximum number of inspection information (N), the inspection awaiting information updating of all inspection items is finished.

If the inspection awaiting information updating of all inspection items is not yet finished, the processing branches to the step 702, at which the inspection awaiting information updating of the next inspection item is performed.

By repeating this operation, the inspection awaiting information updating of all inspection items is soon finished, the judgement that the inspection awaiting information updating of all inspection items is finished is made, and the main inspection awaiting information updating is terminated.

The operation in FIG. 11B will now be described.

Step 801: The temporary current pointer (PNT1) is provided.

Whether or not the inspection awaiting information is the inspection result information of which inspection is complete is checked.

Unless the resultant inspection time of day (PNT1-JT) of the inspection awaiting information pointed by the temporary current pointer is 0, the inspection awaiting information is the inspection result information of which inspection is already complete.

If it is the inspection result information, the processing jumps to step 811, at which the child inspection awaiting information updated.

Step 802: Whether there is parent inspection awaiting information or not is checked.

There is the parent inspection awaiting information unless the parent inspection awaiting information pointer (PNT1-PP) of the inspection awaiting information pointed by the temporary current pointer is 0.

If there is no parent inspection awaiting information, the processing branches to step 804.

If the parent inspection awaiting information exists, the next scheduled inspection time of day (PNT1-

PP-ET) of the parent inspection awaiting information is copied to the inspection awaiting start time of day (PNT1-ST) at step 803. By this operation, the next scheduled inspection time of day of the inspection awaiting information having the parent information awaiting information is calculated in reference to the next scheduled inspection time of day of the parent inspection awaiting information.

Step 804: The ET operation processing is called to update the next scheduled inspection time of day of the inspection awaiting information.

Step 805: The current time of day is read and compared with the pre-announced time of day.

The pre-announced time of day is found by subtracting the pre-announced time (YT) from the next scheduled inspection time of day.

The pre-announced time (YT) is the data stored in the SRAM 2 and can be accessed for setting and display from the CRT/MDI unit 7.

If the current time of day is not past the pre-announced time of day, the processing jumps to step 807.

If the current time of day is past the pre-announced time of day, a pre-announcement message is output at step 806. For example, a pre-announcement message line "INSPECTION WORK TIME OF DAY PRE-ANNOUNCEMENT:", the inspection item (NAME) and the pre-announced time of day are displayed on the CRT/MDI unit 7, and at the same time, delivered to the communication devices, such as the host computer, through the communication control unit 11 and the communication line 12, and given to the operator through the modem 13 over the telephone line, or through the voice output device 10 by means of a voice.

Step 807: The current time of day is read and compared with the next scheduled inspection time of day (ET).

If the current time of day is not past the next scheduled inspection time of day (ET), the processing jumps to step 811.

Step 808: If the current time of day is past the next scheduled inspection time of day (ET), the inspection completion information is checked.

The inspection completion information is the data indicating whether "yes" has been entered from the CRT/MDI unit 7 and stored in the SRAM 2.

If the inspection completion information is "yes", the current time of day is set, at step 809, to the resultant inspection time of day (JT) and the next scheduled inspection time of day (ET).

If the inspection completion information is not "yes", a next scheduled inspection time of day arrival message is output at step 810.

For example, an arrival message like "INSPECTION WORK TIME OF DAY ARRIVAL:" and the inspection item (NAME) are displayed on the CRT/MDI unit 7, and at the same time, delivered to the communication devices, such as the host computer, through the communication control unit 11 and the communication line 12, and given to the operator through the modem 13 over the telephone line, or through the voice output device 10 by means of a voice.

Step 811: Whether the child inspection awaiting information 1 exists or not is checked. The child inspection awaiting information 1 exists unless the child inspection awaiting information pointer 1 (PNT1-CP1) is 0.

If the child inspection awaiting information 1 does not exist, the processing branches to step 814.

Step 812: If the child inspection awaiting information 1 exists, the child inspection awaiting information pointer 1 (PNT1-CP1) is set to the temporary current pointer (PNT1).

Step 813: The sub inspection awaiting information update processing (itself) is called whereby the inspection awaiting information is updated, beginning with the child inspection awaiting information 1.

Step 814: Whether the child inspection awaiting information 2 exists or not is checked.

The child inspection awaiting information 2 exists unless the child inspection awaiting information pointer 2 (PNT1-CP2) is 0.

If the child inspection awaiting information 2 does not exist, the processing branches to step 817.

Step 815: If the child inspection awaiting information 2 exists, the child inspection awaiting information pointer 2 (PNT1-CP2) is set to the temporary current pointer (PNT1).

Step 816: The sub inspection awaiting information update processing (itself) is called whereby the inspection awaiting information is updated, beginning with the child inspection awaiting information 2.

Step 817: To make this processing a recursive call structure, if the processing has been recursive called, the temporary current (PNT1) is returned to the original status.

The parent inspection awaiting information exists when the subroutine has been recursive called.

When there is the parent inspection awaiting information, the parent inspection awaiting information pointer (PNT1-PP) is not 0.

If the subroutine has not been recursive called, the operation returns to the processing called.

When the processing has been recursive called, the parent inspection awaiting information pointer (PNT1-PP) is set, at step 818, to the temporary current pointer (PNT1) whereby the temporary current pointer (PNT1) is restored to the original status and the operation returned to the processing called.

The operation in FIG. 12A will now be described.

Step 901: The temporary current pointer (PNT1) is provided.

If the inspection interval condition (PNT1-COND) is not unconditional, the processing branches to step 903.

If the inspection interval condition (PNT1-COND) is unconditional, the addition result of the inspection awaiting start time of day (PNT1-ST) and the inspection interval (PNT1-TIME) is set, at step 902, to the next scheduled inspection time of day (PNT1-ET), and the processing returns.

Step 903: If the inspection interval condition (PNT1-COND) is not "during power-on", the processing branches to step 906.

If the inspection interval condition (PNT1-COND) is "during power-on", a power-on schedule pointer (PYP) is set to a temporary schedule pointer (PNTY) and a power-on result pointer (PJP) set to a temporary result pointer (PNTJ), at step 904, to prepare for calling the sub ET operation, the sub ET operation is called at step 905 whereby the next scheduled inspection time of day (PNT1-ET) is set, and the processing returns.

Step 906: If the inspection interval condition (PNT1-COND) is not "during run", the processing branches to step 903.

If the inspection interval condition (PNT1-COND) is "during run", a run schedule pointer (UYP) is set to the temporary schedule pointer (PNTY) and a run result pointer (UJP) set to the temporary result pointer (PNTJ), at step 907, to prepare for calling the sub ET operation, the sub ET operation is called at step 908, whereby the next scheduled inspection time of day (PNT1-ET) is set, and the processing returns.

Step 909: If the inspection interval condition (PNT1-COND) is not "during cutting", the processing returns.

If the inspection interval condition (PNT1-COND) is "during cutting", a cutting schedule pointer (CYP) is set to the temporary schedule pointer (PNTY) and a cutting result pointer (CJP) set to the temporary result pointer (PNTJ), at step 910, to prepare for calling the sub ET operation, the sub ET operation is called at step 911 whereby the next scheduled inspection time of day (PNT1-ET) is set, and the processing returns.

The operation in FIG. 12B will now be described.

Step 1001: The temporary current pointer (PNT1), the temporary schedule pointer (PNTY) and the temporary result pointer (PNTJ) are provided.

The inspection awaiting start time of day (PNT1-ST) is set to the temporary inspection awaiting start time of day (STMP), and the inspection interval (PNT1-TIME) set to the temporary inspection interval (TTMP).

Step 1002: To prepare for calling sub-sub ET operation, the temporary result pointer (PNTJ) is set to the temporary time table pointer (PNTT).

Step 1003: The sub-sub ET operation is called and the result table is traced to calculate the next scheduled inspection time of day (PNT1-ET).

Step 1004: Whether or not the next scheduled inspection time of day (PNT1-ET) has already been determined by the above processing is checked.

Unless the temporary interval (TTMP) is positive, the next scheduled inspection time of day (PNT1-ET) has already been determined.

If the next scheduled inspection time of day (PNT1-ET) has been determined, the processing.

Step 1005: If the next scheduled inspection time of day (PNT1-ET) has not yet been determined, the temporary schedule pointer (PNTY) is set to the temporary time table pointer (PNTT) to prepare for calling the sub-sub ET operation.

Step 1006: The sub-sub ET operation is called and the schedule table is traced to calculate the next scheduled inspection time of day (PNT1-ET).

Step 1007: Whether or not the next scheduled inspection time of day (PNT1-ET) has already been determined by the above processing is checked.

Unless the temporary interval (TTMP) is positive, the next scheduled inspection time of day(PNT1-ET) has been determined.

If the next scheduled inspection time of day (PNT1-ET) has been determined, the processing returns. If the next scheduled inspection time of day (PNT1-ET) has not yet been determined, the information in the result table and the schedule table is insufficient and the next scheduled inspection time of day (PNT1-ET) cannot be found from said data. At this time, the addition result of the inspection awaiting start time of day (PNT1-ST) and the inspection interval (PNT1-TIME) is set to the next scheduled inspection time of day (PNT1-ET), and the processing returns.

The operation in FIG. 12C will now be described.

Step 1101: The temporary inspection awaiting start time of day (STEP), the temporary inspection interval (TTMP) and the temporary time table pointer (PNTT) are provided.

Whether or not the end time of day (PNTT-OF) of the table designated by the temporary time table pointer is later than the temporary inspection awaiting start time of day (STEM) is checked.

If the end time of day (PNTT-OF) is later than the temporary inspection awaiting start time of day (STEMP), the processing branches to step 1104.

Step 1102: If the end time of day (PNTT-OF) is not later than the temporary inspection awaiting start time of day (STMP), the next data pointer (PNTT-NP) of the table pointed by the temporary time table pointer is set to the temporary time table pointer (PNTT), whereby the temporary time table pointer (PNTT) is updated to the next table.

Step 1103: Whether that table is the final table or not is checked. If it is the final one, the temporary time table pointer (PNTT) is 0.

If the table is final one, the information later than the temporary inspection awaiting start time of day (STMP) does not exist in the sequence of the run result memory or the run schedule memory, and the processing returns without further operation.

If the table is not the last one, the processing branches to the step 1101 and checks the next table. This operation is repeated.

Step 1104: Since the end time of day (PNTT-OF) is later than the temporary inspection awaiting start time of day (STMP), a comparison is made between the start time of day (PNTT-ON) and the temporary inspection awaiting start time of day (STEMP).

If the start time of day (PNTT-ON) is later than the temporary inspection awaiting start time of day (STMP), the length of time from the start time of day (PNTT-ON) to the end time of day (PNTT-OF) is covered by the inspection interval. Hence, at step 1105, the period of time from the start time of day (PNTT-ON) to the end time of day (PNTT-OF) is subtracted from the temporary inspection interval (TTMP), and the processing jumps to step 1107.

If the temporary inspection awaiting start time of day (STMP) is later than the start time of day (PNTT-ON), the length of time from the temporary inspection awaiting start time of day (STMP) to the end time of day (PNTT-OF) is covered by the inspection interval. Hence, at step 1106, the period of time from the temporary inspection awaiting start time of day (STMP) to the end of day (PNTT-OF) is subtracted from the temporary inspection interval (TTMP).

Step 1107: Whether or not the next scheduled inspection time of day (PNTT-ET) is earlier than the end time of day (PNTT-OF) is checked. Unless the temporary inspection interval (TTMP) is positive, the next scheduled inspection time of day (PNTT-ET) is earlier than the end time of day (PNTT-OF).

If the next scheduled inspection time of day (PNTT-ET) is earlier than the end time of day (PNTT-OF), the addition result of the end time of day (PNTT-OF) and the temporary inspection interval (TTMP) is set to the next scheduled inspection time of day (PNTT-ET), and the processing returns.

If the next scheduled inspection time of day (PNTT-ET) is not earlier than the end time of day (PNTT-OF), the processing branches to step 1109.

Step 1109: Whether the table is the last one or not is checked. If it is the final one, the next data pointer (PNTT-NP) of the table pointer by the temporary time table pointer is 0.

If the table is the final one, the information later than the temporary inspection awaiting start time of day (STMP) exists in the sequence of the run result memory or the run schedule memory, but the information until the next scheduled inspection time of day (PNTT-ET) does not exist.

Since the run time from the temporary inspection awaiting start time of day (STMP) to the end time of day (PNTT-OF) of the last table has been subtracted from the temporary inspection interval (TTMP) in the above processing, the end time of day (PNTT-OF) of the last table is set to the temporary inspection awaiting start time of day (STMP) at step 1110, and the processing returns.

If the table is not the last one, the processing branches to the step 1111.

Step 1111: IF the table is not final, the next data pointer (PNTT-NP) is set to the temporary time table pointer (PNTT) to check the next table. Then, the period of time from the start time of day (PNTT-ON) to the end time of day (PNTT-OF) is subtracted from the temporary inspection interval (TTMP) and the processing branches to the step 1107, thereby checking the next table. This operation is repeated until the final table is checked.

FIG. 8B provides an example of the inspection pre-announcement message and the inspection work time of day arrival message displayed on the CRT/MDI unit 7, wherein displayed are the inspection work time of day arrival message "INSPECTION WORK TIME OF DAY ARRIVAL: BELT REPLACEMENT", the inspection work time of day pre-announcement message "INSPECTION WORK TIME OF DAY PRE-ANNOUNCEMENT: OIL LEVEL CHECK", the inspection work time of day pre-announcement message "DATE: 08 O'CLOCK, SEP. 21, 1990" and a message urging the operator to enter work completion information "WORK COMPLETE? (yes/no)". When the work completion information "yes" is entered on this screen, the inspection work time of day arrival message "INSPECTION WORK TIME OF DAY ARRIVAL: BELT REPLACEMENT" disappears. Further, the downward arrow ( ↓ ) and TOD display (16:35) representing that the "BELT REPLACEMENT" is scheduled for 16 o'clock 35 minutes on September 20 and the inspection work is not finished disappear, and the upward arrow ( ↑ ) and the TOD display (19:05) are displayed in the current time of day section, indicating that the inspection work is finished.

(1) The present invention, as described above, ensures improved productivity and labor saving since the invention allows the time of day when a specific command in a machining command program will be executed to be automatically expected, whereby work schedule mistakes due to the mis-estimation of the worker is prevented, an efficient work schedule can be mapped out, and one worker is made responsible for a plurality of machines more easily.

(2) The present invention also allows certain maintenance and inspection work and relevant maintenance and inspection work to be managed in connection with each other, ensuring a through maintenance and inspection work schedule.

Further, the present invention allows scheduled maintenance and inspection work time to be operated on with reference to a run schedule, whereby a practical maintenance and inspection work schedule can be made in correspondence with the operation schedules of machines.

What is claimed is:

1. In a numerical control unit for performing numerical control processing on the basis of a machining command program and driving a machine tool according to the results of said processing whereby a workpiece is machined, the improvement comprising:
   a clock for counting a cycle signal and updating an initial time to generate a current time;
   initial time setting means for setting said clock at a selectable initial time;
   current time reading means for reading a current time from said clock;
   a time memory table for storing at least one of (i) a first expected run time of the machining command program and (ii) a second expected run time from the start of the machining command program to the execution of at least one specified command in the machining command program;
   expected run time setting means for storing in said time memory table at least one of said first expected run time and said second expected run time;
   time expecting means for operating on at least one of said first expected run time and second expected run time from said table and a current time from said clock and thereby generating a corresponding first expected end time, comprising the end of said run, and a second expected end time, comprising the time of specified command execution;
   automatic start detecting means for detecting the start of the machining command program run; and
   wherein said current time reading means is operative to read the current time in response to the detection by said automatic start detecting means of the start of the machining command program run, and
   in response thereto, said time expecting means operates on at least one of said first expected run end time and said second expected run end time from said time expecting means and said first expected run time and second expected run time stored in said time memory table.

2. A numerical control unit, as set forth in claim 1, wherein said expected run time setting means comprises:
   machining command program analyzing means for analyzing the machining command program and generating analysis data;
   expected execution time operating means for operating on expected execution time from said analysis data;
   expected execution time accumulating means wherein the expected execution time is accumulated;
   first command determining means for determining a run end command and specific commands from said analysis data; and
   wherein at least one of said first expected run time and said second expected run time is operated on and set into said time memory table.

3. A numerical control unit, as set forth in claim 2, comprising:
   a message memory table corresponding to said time memory table for storing at least one of a message concerning said first expected run end time and a message concerning said specific commands of said second expected run end time;

message setting means for storing said messages in said message memory table;

reporting means for reporting said messages; and wherein data in the machining command program is stored and reported by said messages by said machining program analyzing means.

4. A numerical control unit, as set forth in claim 1, further comprising an optional stop switch having a valid and invalid state, wherein said specific command is only a program stop command if said optional stop switch is invalid and said specific command comprises both a program stop command and an optional program stop command if said optional stop switch is valid.

5. A numerical control unit, as set forth in claim 1, further comprising reporting means for reporting at least one of said first expected end time and said second expected end time.

6. A numerical control unit, as set forth in claim 1, comprising:

reporting means for reporting a scheduled time of arrival;

time comparing means for comparing said current time read from said clock with at least one of said first expected end time and said second expected end time; and means for generating a scheduled time of arrival report in response to said clock current time being past said at least one first and second expected end time.

7. A numerical control unit, as set forth in claim 1, comprising:

an expected time memory table for storing at least one of said first expected end time and said second expected end time;

an expected time setting means for storing in said expected time memory table at least one of said first expected end time and said second expected end time;

a resultant time memory table for storing resultant times associated with at least one of said first and second expected end times;

resultant time setting means for storing the time read current in said resultant time memory table; and displaying means for displaying said expected time and said resultant time.

8. A numerical control unit, as set forth in claim 7, comprising:

second command determining means for determining the execution of a run end command; and means for activating the resultant time setting means to automatically set the resultant time when said run end command is executed.

9. A numerical control unit, as set forth in claim 7, comprising:

third command determining means for determining the start of execution of a command subsequent to a specific command in the machining program; and means for activating said resultant time setting means to automatically store said resultant time when the command subsequent to said specific command in the machining command program is executed.

10. A numerical control unit, as set forth in claim 7, comprising:

expected error time operating means for calculating expected error time by subtracting said resultant time from said expected time; and displaying means for displaying expected error time.

11. A numerical control unit, as set forth in claim 7, comprising:

expected error time operating means for calculating expected error time by subtracting said resultant time from said expected time;

expected time updating means for updating said expected time memory table by adding an expected error time to an expected time stored in said expected time memory table; and wherein said expected time is updated concurrently with the setting of said resultant time.

12. A numerical control unit, as set forth in claim 7, comprising:

reporting means for reporting said expected time and said resultant time.

13. A numerical control unit, as set forth in claim 7, comprising:

reporting means for reporting a pre-announced time of arrival;

a pre-announced time memory for storing said pre-announced time which comprises a time difference between said expected time and said pre-announced time stored before said expected time;

pre-announced time setting means for storing said pre-announced time in said pre-announced time memory;

pre-announced time operating means for calculating said pre-announced time by subtracting said pre-announced time from said expected time;

time comparing means for comparing arbitrary times; and means for the current time read from said clock with said pre-announced time, and means for generating a pre-announced time arrival report when said current time is past said pre-announced time.

14. A numerical control unit, as set forth in claim 1, wherein said expected run time setting means comprises:

an ejected chip volume memory for storing a chip volume to be ejected;

ejected chip volume setting means for storing said ejected chip volume in said ejected chip volume memory;

machining command program analyzing means for analyzing the machining command program;

expected chip volume operating means for calculating an expected chip volume from analysis data;

expected chip volume accumulating means for accumulating said expected chip volumes;

ejection block specifying means for comparing the expected chip volume accumulation and the ejected chip volume, specifying each command block wherein the expected chip volume accumulation is greater than an integral multiple of the ejected chip volume, and specifying blocks for which chips must be ejected;

expected execution time operating means for operating on expected execution time from said analysis data;

expected execution time accumulating means for accumulating said expected execution time;

fourth command determining means for determining the ejection block specified according to said analysis data; and wherein the expected run end time, until the ejection block in the machining command program is executed, is operated on and stored in said time memory table.

15. A numerical control unit, as set forth in claim 14, wherein said ejection block specifying means specifies as the ejection block a first tool change command given after any command blocks wherein the expected chip volume accumulation is greater than an integral multiple of the ejected chip volume.

16. A numerical control unit, as set forth in claim 1, comprising:
- a message memory table for storing messages of a run end command and specific commands corresponding to the time memory table;
- message setting means for storing said messages in said message memory table; and
- reporting means for reporting the messages.

17. A numerical control unit, as set forth in claim 1, wherein said specific command is a program stop command.

18. A numerical control unit comprising:
- a clock for counting a cycle signal and updating time of day;
- TOD setting means for setting arbitrary time of day to the clock;
- TOD reading means for reading time of day from said clock;
- an inspection awaiting information memory table for storing inspection awaiting information, said inspection awaiting information comprising one or more of data identifying inspection items, inspection intervals, related inspection information link information, and inspection awaiting start time;
- TOD comparing means for comparing the time of day read from said clock and the scheduled inspection time of day;
- inspection completion information input means;
- a run schedule memory for storing at least one of scheduled times of day for power-on, run start and cutting start, and scheduled times of day for power-off, run end and cutting end;
- setting means for storing in said run schedule memory at least one of said scheduled times of day for power-on, run start and cutting start, and said scheduled times of day for power-off, run end and cutting end;
- next scheduled inspection TOD estimating means for estimating next scheduled inspection time of day from said inspection interval, inspection awaiting start time of day, and run schedule;
- registering and deleting means for registering new inspection awaiting information in said inspection awaiting information memory table and deleting specific inspection awaiting information from said inspection awaiting information memory table;
- reporting means for reporting at least the scheduled inspection time of day and scheduled inspection time of day arrival information;
- wherein the associated inspection awaiting information may be deleted from or newly generated inspection time registered to said inspection awaiting information memory table when inspection completion information is entered;
- wherein the next scheduled inspection time of day may be estimated from the time of day read from said clock and said inspection interval, inspection awaiting start time of day, inspection time counting condition and run schedule corresponding to the inspection awaiting information;
- means for updating and for reporting the scheduled inspection time of day in the inspection awaiting information; and
- means for comparing the time of day read from said clock with the scheduled inspection time of day in said inspection awaiting information, and means for reporting scheduled inspection time of day arrival information when said clock is past the scheduled inspection time of day.

19. A numerical control unit, as set forth in claim 18, wherein said scheduled inspection time of day arrival information differs corresponding to the inspection item.

20. A numerical control unit, as set forth in claim 18, comprising:
- reporting means for reporting inspection pre-announcement;
- a pre-announced time memory for storing a pre-announced time which comprises a time difference between the scheduled time of day and the pre-announced time of day set before the scheduled time of day;
- pre-announced time setting means for setting the pre-announced time to the pre-announced time memory;
- pre-announced TOD operating means for calculating the pre-announced time of day by subtracting the pre-announced time from the scheduled time of day;
- TOD comparing means for comparing arbitrary times of day; and
- means for comparing the time of day read from the clock with the pre-announced time of day, and means for pre-announcing inspection when said clock is past the pre-announced time of day.

21. A numerical control unit, as set forth in claim 18, wherein the inspection awaiting information comprises an inspection interval condition to provide the inspection interval with the inspection interval condition comprising at least one of elapsed time, power-on duration, run time or cutting time; and
- wherein said next scheduled inspection TOD estimating means estimates the next scheduled inspection time of day from the inspection interval, the inspection awaiting start time of day, the run schedule and the inspection interval condition.

22. A numerical control unit, as set forth in claim 18, further comprising:
- a run result memory for storing at least one resultant time of day for at least one of power-on, run start and cutting start and at least one resultant time of day for at least one of power-off, run end and cutting end;
- run result writing means for writing to the run result memory the resultant times of day for at least one of power-on, run start and cutting start operations and the resultant times of day for at least one of power-off, run end and cutting end operations; and
- wherein the next scheduled inspection TOD estimating means estimates the next scheduled inspection time of day from the inspection interval, the inspection awaiting start time of day, the run schedule and the run results.

23. A numerical control unit, as set forth in any one of claims 5, 6, 12, 13, 16, 3, 18 and 20, wherein said reporting means comprises display means.

24. A numerical control unit, as set forth in claims 5, 6, 12, 13, 16, 3, 18 and 20, wherein said reporting means comprises communication means.

25. A numerical control unit, as set forth in claim 24 wherein said communication means comprises a telephone line.

26. A numerical control unit, as set forth in claim 24 wherein said communication means transmits a voice signal.

27. A numerical control method comprising:
generating a time of day value;
storing inspection awaiting information, said inspection awaiting information comprising one or more of data identifying inspection items, inspection intervals, related inspection information link information, and inspection awaiting start time;
comparing said generated time of day and the scheduled inspection time of day;
storing at least one of scheduled times of day for power-on, run start and cutting start, and scheduled times of day for power-off, run end and cutting end;
storing at least one of said scheduled times of day for power-on, run start and cutting start, and said scheduled times of day for power-off, run end and cutting end;
estimating next scheduled inspection time of day from said inspection interval, inspection awaiting start time of day, and a run schedule;
registering new inspection awaiting information in an inspection awaiting information memory table and deleting specific inspection awaiting information from said inspection awaiting information memory table;
reporting at least the scheduled inspection time of day and scheduled inspection time of day arrival information;
wherein the associated inspection awaiting information may be deleted from or newly generated inspection time registered to said inspection awaiting information memory table when inspection completion information is entered;
wherein the next scheduled inspection time of day may be estimated from said generated time of day and said inspection interval, inspection awaiting start time of day, inspection time counting condition and run schedule corresponding to the inspection awaiting information, and the scheduled inspection time of day in the inspection awaiting information may be updated and reported; and
wherein said generated time of day is compared with the scheduled inspection time of day, and scheduled inspection time of day arrival information is reported when said generated time of day is past the scheduled inspection time of day.

28. In a method of performing numerical control processing on the basis of a machining command program and driving a machine tool according to the results of said processing whereby a workpiece is machined, the improvement comprising:
generating a current time;
storing in a time memory table at least one of (i) a first expected run time of the machining command program and (ii) a second expected run time from the start of the machining command program to the execution of at least one specified command in the machining command program;
analyzing the machining command program and generating analysis data;
operating on expected execution time from said analysis data;
accumulating the expected execution time;
determining a run end command and specific commands from said analysis data;
wherein at least one of said first expected run time and said second expected run time is operated on and set into said time memory table; and
generating, on the basis of a current time value and at least one of said first expected run time and said second expected run time, a corresponding first expected end time, comprising the end of said command program run, and a second expected end time, comprising the time of a specified command execution.

29. In a method of performing numerical control processing on the basis of a machining command program and driving a machine tool according to the results of said processing whereby a workpiece is machined, the improvement comprising:
generating a current time;
storing in a time memory table at least one of (i) a first expected run time of the machining command program and (ii) a second expected run time from the start of the machining command program to the execution of at least one specified command in the machining command program;
generating, on the basis of a current time value and at least one of said first expected run time and said second expected run time, a corresponding first expected end time, comprising the end of said command program run, and a second expected end time, comprising the time of a specified command execution;
reporting a scheduled time of arrival;
comparing said current time with at least one of said first expected end time and said second expected end time; and
generating a scheduled time of arrival report in response to said current time being past said at least one first and second expected end time.

30. In a method of performing numerical control processing on the basis of a machining command program and driving a machine tool according to the results of said processing whereby a workpiece is machined, the improvement comprising:
generating a current time;
storing in a time memory table at least one of (i) a first expected run time of the machining command program and (ii) a second expected run time from the start of the machining command program to the execution of at least one specified command in the machining command program;
generating, on the basis of a current time value and at least one of said first expected run time and said second expected run time, a corresponding first expected end time, comprising the end of said command program run, and a second expected end time, comprising the time of a specified command execution;
storing in said expected time memory table at least one of said first expected end time and said second expected end time;
storing resultant times associated with at least one of said first and second expected end times; and
displaying said expected time and said resultant time.

31. In a method of performing numerical control processing on the basis of a machining command program and driving a machine tool according to the results of said processing whereby a workpiece is machined, the improvement comprising:

generating a current time;

storing in a time memory table at least one of (i) a first expected run time of the machining command program and (ii) a second expected run time from the start of the machining command program to the execution of at least one specified command in the machining command program;

generating, on the basis of a current time value and at least one of said first expected run time and said second expected run time, a corresponding first expected end time, comprising the end of said command program run, and a second expected end time, comprising the time of a specified command execution;

storing a chip volume to be ejected;

analyzing the machining command program;

calculating an expected chip volume from analysis data;

accumulating said expected chip volumes;

comparing the expected chip volume accumulation and the ejected chip volume, specifying each command block wherein the expected chip volume accumulation is greater than an integral multiple of the ejected chip volume, and specifying blocks for which chips must be ejected;

operating on expected execution time from said analysis data;

accumulating said expected execution time;

determining the ejection block specified according to said analysis data; and wherein the expected run end time until the ejection block in the machining command program is executed is operated on and stored.

32. In a method of performing numerical control processing on the basis of a machining command program and driving a machine tool according to the results of said processing whereby a workpiece is machined, the improvement comprising:

generating a current time;

storing in a time memory table at least one of (i) a first expected run time of the machining command program and (ii) a second expected run time from the start of the machining command program to the execution of at least one specified command in the machining command program;

generating, on the basis of a current time value and at least one of said first expected run time and said second expected run time, a corresponding first expected end time, comprising the end of said command program run, and a second expected end time, comprising the time of a specified command execution;

storing a chip volume to be ejected;

analyzing the machining command program;

calculating an expected chip volume from analysis data;

accumulating said expected chip volumes;

comparing the expected chip volume accumulation and the ejected chip volume, specifying each command block wherein the expected chip volume accumulation is greater than an integral multiple of the ejected chip volume, and specifying blocks for which chips must be ejected;

operating on expected execution time from said analysis data;

accumulating said expected execution time;

determining the ejection block specified according to said analysis data; and wherein the expected run end time until the ejection block in the machining command program is executed is operated on and stored; and specifying as the ejection block a first tool change command given after any command blocks wherein the expected chip volume accumulation is greater than an integral multiple of the ejected chip volume.

33. In a method of performing numerical control processing on the basis of a machining command program and driving a machine tool according to the results of said processing whereby a workpiece is machined, the improvement comprising:

generating a current time;

storing in a time memory table at least one of (i) a first expected run time of the machining command program and (ii) a second expected run time from the start of the machining command program to the execution of at least one specified command in the machining command program; and generating, on the basis of a current time value and at least one of said first expected run time and said second expected run time, a corresponding first expected end time, comprising the end of said command program run, and a second expected end time, comprising the time of a specified command execution;

storing messages of a run end command and specific commands corresponding to the time memory table;

storing said messages in a message memory table; and reporting the messages.

* * * * *